(12) United States Patent
Grange et al.

(10) Patent No.: US 11,753,324 B2
(45) Date of Patent: Sep. 12, 2023

(54) METHOD FOR TREATING AN EFFLUENT SUPERSATURATED WITH CALCIUM CARBONATE IN THE PRESENCE OF PHOSPHONATE PRECIPITATION-INHIBITING PRODUCTS

(71) Applicant: VEOLIA WATER SOLUTIONS & TECHNOLOGIES SUPPORT, Saint Maurice (FR)

(72) Inventors: Didier Grange, Saint Just St Rambert (FR); M. Coste, Paris (FR); E. Barbier, Montesson (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 57 days.

(21) Appl. No.: 15/511,950

(22) PCT Filed: Sep. 14, 2015

(86) PCT No.: PCT/EP2015/070917
§ 371 (c)(1),
(2) Date: Mar. 16, 2017

(87) PCT Pub. No.: WO2016/041887
PCT Pub. Date: Mar. 24, 2016

(65) Prior Publication Data
US 2019/0023595 A1    Jan. 24, 2019

(30) Foreign Application Priority Data
Sep. 17, 2014 (FR) ..................... 1458779

(51) Int. Cl.
*C02F 5/06* (2023.01)
*C02F 1/28* (2023.01)
(Continued)

(52) U.S. Cl.
CPC .............. *C02F 5/06* (2013.01); *B01D 61/026* (2022.08); *C02F 1/281* (2013.01); *C02F 1/441* (2013.01);
(Continued)

(58) Field of Classification Search
None
See application file for complete search history.

(56) References Cited

U.S. PATENT DOCUMENTS 3,262,877 A * 7/1966 Compte, Jr. .............. C02F 5/02
162/190
5,501,798 A 3/1996 Al-Samadi et al.
(Continued)

FOREIGN PATENT DOCUMENTS

FR      2863908      6/2005
WO    2008055827    5/2008
(Continued)

OTHER PUBLICATIONS

McCool et al.: "Antiscalant removal in accelerated desupersaturation of RO concentrate via chemically-enhanced seeded precipitation (CESP)"; Water Research, Water Technology Research Center, 2012, pp. 1-11.
(Continued)

*Primary Examiner* — Jason M Greene
*Assistant Examiner* — Eric J McCullough
(74) *Attorney, Agent, or Firm* — COATS & BENNETT, PLLC

(57) ABSTRACT

The present invention relates to a method for treating an aqueous liquid effluent containing calcium and carbonate ions and containing precipitation-inhibiting products, said process comprising the following successive steps:
a) providing an aqueous liquid effluent supersaturated with $CaCO_3$ and containing precipitation-inhibiting products;
(Continued)

b) having the effluent obtained in step a) pass into a reactor with high solid content with a solid content maintained between 20 and 800 g/l and integrated solid-liquid separation, at a pH comprised between 8 and 9.2 allowing in a single step precipitation in situ of the aragonite polymorph of calcium carbonate and removal of the precipitation-inhibiting products;

c) recovering an aqueous liquid supernatant containing a suspended solids content of less than or equal to 0.1% by mass of the solid content in the reactor, advantageously a suspended solids content of less than 50 mg/l, the precipitation-inhibiting products being phosphonates.

14 Claims, 9 Drawing Sheets

(51) Int. Cl.

| | | |
|---|---|---|
| C02F 1/44 | (2023.01) | |
| C02F 1/66 | (2023.01) | |
| C02F 5/14 | (2023.01) | |
| B01D 61/02 | (2006.01) | |
| C02F 101/10 | (2006.01) | |
| C02F 101/30 | (2006.01) | |
| C02F 1/469 | (2023.01) | |
| C02F 103/16 | (2006.01) | |
| C02F 1/52 | (2023.01) | |
| C02F 103/10 | (2006.01) | |
| C02F 101/00 | (2006.01) | |
| C02F 11/12 | (2019.01) | |
| C02F 101/20 | (2006.01) | |

(52) U.S. Cl.
CPC ............ *C02F 1/442* (2013.01); *C02F 1/445* (2013.01); *C02F 1/66* (2013.01); *C02F 5/14* (2013.01); *B01D 61/025* (2013.01); *B01D 61/027* (2013.01); *B01D 2317/025* (2013.01); *C02F 1/4693* (2013.01); *C02F 11/12* (2013.01); *C02F 2001/5218* (2013.01); *C02F 2101/006* (2013.01); *C02F 2101/101* (2013.01); *C02F 2101/105* (2013.01); *C02F 2101/108* (2013.01); *C02F 2101/20* (2013.01); *C02F 2101/303* (2013.01); *C02F 2103/10* (2013.01); *C02F 2103/16* (2013.01); *C02F 2209/06* (2013.01); *C02F 2209/10* (2013.01); *C02F 2301/024* (2013.01); *C02F 2301/028* (2013.01); *C02F 2303/18* (2013.01); *C02F 2303/22* (2013.01); *C02F 2303/24* (2013.01)

(56) References Cited

U.S. PATENT DOCUMENTS

| | | | | |
|---|---|---|---|---|
| 5,601,704 | A | * | 2/1997 | Salem .................... B01D 21/06 210/86 |
| 6,113,797 | A | * | 9/2000 | Al-Samadi .......... B01D 61/022 210/650 |
| 7,648,638 | B2 | | 1/2010 | Essemiani et al. |
| 2002/0158025 | A1 | * | 10/2002 | Streat ........................ C02F 1/52 210/738 |
| 2004/0245177 | A1 | * | 12/2004 | Pipes ................... B01D 61/025 210/641 |
| 2005/0098499 | A1 | * | 5/2005 | Hussain ................. B01D 61/04 210/639 |
| 2009/0255673 | A1 | * | 10/2009 | Minnich .................. E21B 43/24 166/266 |
| 2011/0104038 | A1 | * | 5/2011 | DiTommaso .......... C02F 1/441 423/430 |
| 2011/0163032 | A1 | * | 7/2011 | Alexander ................ C02F 9/00 210/638 |

FOREIGN PATENT DOCUMENTS

| | | |
|---|---|---|
| WO | 2009045100 | 4/2009 |
| WO | 2009152148 | 12/2009 |
| WO | 2012040880 | 4/2012 |
| WO | 2013150222 | 10/2013 |

OTHER PUBLICATIONS

Sanciolo et al.: "Accelerated seeded precipitation pre-treatment of municipal wastewater to reduce scaling"; Chemosphere; Institute for Sustainability and Innovation, vol. 72, 2008, pp. 243-249.

Amjad et al.: "Calcium Carbonate Precipitation in the Presence of Inhibitors"; Chemical Treatment, Materials Performance, 2007, pp. 42-47.

Greenlee et al.: "Effect of antiscalant degradation on salt precipitation and solid/liquid separation of RO concentrale"; Journal of Membrane Science, vol. 366, 2011, pp. 48-61.

Bremere et al.: "Controlling scaling in membrane filtration systems using a desupersaturation unit"; Desalination, vol. 124, 1999, pp. 59-62.

Rahardianto et al.: "High recovery membrane desalting of low-salinity brackish water: Integration of accelerated precipitation softening with membrane RO"; Journal of Membrane Science, Science Direct, vol. 289, 2007, pp. 123-137.

Gabelich et al.: "High-recovery reverse osmosis desalination using intermediate chemical demineralization"; Journal of Membrane Science, Science Direct, vol. 301, 2007, pp. 131-141.

International Search Report issued in corresponding International Application PCT/EP2015/070917 dated Dec. 18, 2015 (4 pages).

Written Opinion issued in corresponding International Application PCT/EP2015/070917 dated Dec. 18, 2015 (9 pages).

\* cited by examiner

METHOD FOR TREATING AN EFFLUENT SUPERSATURATED WITH CALCIUM CARBONATE IN THE PRESENCE OF PHOSPHONATE PRECIPITATION-INHIBITING PRODUCTS

The present invention relates to the field of treating aqueous liquid effluents concentrated in mineral salts containing phosphonate-type precipitation-inhibiting products, in particular derived from a membrane filtration method. One drawback of membrane filtration techniques is that of producing discharges known as concentrates containing precipitation-inhibiting products which are added so as to prevent the precipitation of insoluble salts that deteriorate the treatment yield of said installations (clogging of membranes).

Three problems arise:

the conversion rate of a filtration step is limited by the osmotic pressure between permeate and concentrate and the risks of fouling of the membranes due to the presence of potentially precipitable mineral species. The conversion rates generally reached do not exceed 80% (in the case of treating mining effluent), due to the clogging of the membranes with the inorganic salts present in the solution and in particular with the calcium ions that may precipitate with other anions;

it is then difficult to provide a global line with conversion rates of more than 95% without incorporating into the line steps of evapo-concentration or hot crystallization of the salts, which are energy-consuming and require expensive equipment;

moreover, in the perspective of discharging concentrates into the natural environment, it is necessary to limit them in order to reduce the environmental impact and to limit the presence of phosphates in these discharges, these phosphates being partly due to the phosphonate-type precipitation-inhibiting products used.

It is thus necessary to provide a technique that improves the performance of membrane filtration installations (increase in conversion rates, reduction of discharges of concentrate, etc.).

In addition, it is recommended to avoid using precipitation reagents such as $Ca(OH)_2$, $CaCl_2$ and $Na_2CO_3$ which are undesirable since they increase the osmotic pressure of the medium and thus lead to a loss of performance on the stage of the membrane filtration method such as nanofiltration (NF) or reverse osmosis (RO).

Moreover, it would be advantageous to be able to clarify the concentrate without using coagulants and/or flocculants, so as to avoid the use of metal salts and clarification polymer, which are harmful to the membranes of the membrane filtration method such as nanofiltration (NF) or reverse osmosis (RO).

U.S. Pat. No. 6,113,797 describes a membrane purification method with a high conversion rate which comprises two stages, the first stage using a low-pressure membrane system to preconcentrate the scaling compounds. However, this method does not indicate how to eliminate the precipitation-inhibiting products that may be used.

U.S. Pat. No. 5,501,798 describes an improved method for extending the lifetime of reverse osmosis membranes allowing the purification of liquid containing insoluble or sparingly soluble inorganic salts. This method includes a step of precipitation of the salts. However, this step is performed via an addition of reagent, which is undesirable since it increases the osmotic pressure of the medium and thus leads to a loss of performance on the stage of the membrane filtration method.

Patent application WO 2009/152148 describes a method for desalinating waters with a high conversion rate. However, in the described method, gypsum and/or an adsorbent and/or a co-precipitating agent is added to seed the precipitation reaction and/or to aid this reaction, which may pose the problems mentioned above. In addition, the adsorption/desaturation/precipitation/separation of the particles takes place in several steps with the need for the presence of a recirculation loop, which makes the method economically unviable. Moreover, the pH during the precipitation is not indicated. Now, it has been proven by the inventors (example 4) that it was necessary to use a particular pH in order to obtain the precipitation of a particular crystalline form of calcium carbonate, the aragonite form, which is the optimum form for efficiently trapping the phosphonate-type precipitation-inhibiting products.

The article by Sanciolo P. et al. (2008), Chemosphere 72, pages 243-249, shows that seeding with limescale makes it possible to very significantly improve the rate of the precipitation reaction. However, the system as described in this document does not have a step of pretreatment of the concentrate directed toward adsorbing/trapping the precipitation-inhibiting products present in said concentrates and does not concern membrane systems. In addition, the recommended pH is a pH of at least 9.5, which is very high and thus economically unviable and gives more waste to be treated.

The article by Brian McCool et al. Water research (2012) I-II describes the use of lime and seeding with gypsum to eliminate the precipitation-inhibiting products present in the effluents. However, no mention is made of a mode of controlling the amount of $CaCO_3$ produced and of the nature of the $CaCO_3$ polymorph produced as a function of the pH (mention is only made here of the dosage of lime). Moreover, no description is given at all of the reactor that can achieve this desaturation operation in situ.

Patent application WO 2012/040880 describes a membrane filtration method with a high conversion rate in which the concentrate after filtration is introduced into a precipitation clarifier at a pH of between 9.5 and 12 or between 10 and 11.5 so as to remove the ions present. A precipitation-inhibiting product may be added to prevent clogging of the membranes. This document also teaches that a coagulant or flocculant may be added so as to accelerate the solid-liquid separation in the precipitation clarifier. Furthermore, before the membrane filtration, the pH of the effluent is adjusted to at least 8.3, using $CO_2$, which also serves to increase the concentration of bicarbonate in the solution before the filtration and which will make it possible to increase the precipitation of calcium in the concentrate once the pH is between 9.5 and 12 or between 10 and 11.5 in the precipitation clarifier. This document does not indicate if the precipitation makes it possible to eliminate the precipitation-inhibiting product that may be added. In addition, the operating pH values inside the precipitation clarifier are very high, which is economically unviable and gives more waste to be treated. Moreover, this document encourages the addition of coagulants and/or flocculants, i.e. desaturation reagents that are harmful to membranes.

Patent application WO 2009/045100 describes a method for purifying a liquid such as water containing a crystallization inhibitor such as phosphonates after it has been passed through a reverse-osmosis or nanofiltration membrane. It thus recommends adding a base to modify the pH of the system and to bring about the precipitation, for example of calcium carbonate crystals. This application recommends using milk of lime as base. Moreover, this application indicates that it is possible to use alternatively, instead of a base, calcium carbonate in aragonite form added to the medium (and thus which is not created in situ) as adsorbent to adsorb the crystallization inhibitors. This application therefore does not encourage combining these two methods.

This application also does not indicate how to produce in situ calcium carbonate in aragonite form continuously or the pH conditions which promote the formation of aragonite in the presence of phosphonates. It gives no characteristics regarding the reactor to be used for performing this method.

Furthermore, using the method described in this document will induce the obtaining of high amount of sludge, which needs to be taking care of and therefore is not environmentally friendly. Moreover, the reactants used will be overdosed since this document does not indicate how to control the calcium carbonate polymorph to be used.

Moreover, it should be noted that this application states that the separation means in the case of adding aragonite are of the type such as filtration, distillation, precipitation or centrifugation. This therefore suggests to a person skilled in the art that the aragonite crystals onto which the phosphonates are adsorbed are in the form of fine particles that are difficult to separate from water. In the light of these conditions, a person skilled in the art would therefore not be encouraged to use a reactor with a high solid content and integrated solid-liquid separation as described in patent application WO 2013/150222 to perform this method since it would not be sufficiently efficient. In addition, a person skilled in the art would have thought that such a reactor would rather promote the formation of the calcite polymorph of calcium carbonate, which is thermodynamically more stable than that of aragonite.

Indeed as indicated in the article of Amjad et al., (Materials performance, October 2007, pages 42-47), the aragonite polymorph of calcium carbonate is not the most stable form, even at high pH.

The experiments in this documents were carried out in batch in a beaker, with certainly a low solid content.

It is thus necessary to find a new method which, while at the same time allowing a high conversion rate to be obtained, will be more economical and friendlier toward the membranes. It is in particular necessary to find a method that will make it possible to eliminate the phosphonate-type precipitation-inhibiting products from effluents.

The inventors realized, surprisingly, that a particular crystalline form of calcium carbonate: the aragonite polymorph, is particularly effective for removing phosphonate-type precipitation-inhibiting products. Specifically, by precipitating in this form, calcium carbonate simultaneously adsorbs these products onto its surface, which allows them to be removed via a simple liquid-solid separation. The inventors also realized that such a precipitation could take place at a pH of between 8 and 9.2, which avoids the use of an excessively high pH, which is not always economically viable, and the formation of insoluble salts (for instance certain magnesium silicates salts which can precipitate at pH above 10 and have a high clogging power). Moreover, the inventors realized that this precipitation could take place in situ without adding precipitation reagents such as lime and/or flocculants and/or coagulants, which are reagents that may be harmful to membranes, which will thus limit the consumption of chemical products. Finally, the inventors realized that this precipitation and the liquid-solid separation could take place in a single step using a particular reactor: a reactor with a high solid content and integrated solid-liquid separation. This makes it possible to provide a compact installation that is less energy-intensive due to the absence of a sludge recirculation loop for maintaining the solid content.

In fact, the inventors have discovered that it is the high pH and the high solid content in the reactor that allow the precipitation of the aragonite polymorph of calcium carbonate, which is really stable in these conditions, contrary to what is indicated in the article of Amjad et al.

It is moreover interesting to have a continuous process, in order to allow the crystals of the aragonite polymorph of calcium carbonate to grow and then precipitate.

Thus, the novel method makes it possible to control the amount and nature of the crystals formed so as to produce the polymorphs required for the removal of the precipitation-inhibiting products and thus to produce just the necessary amount of solid and thus to avoid the formation of large amounts of sludge to be managed thereafter. Finally, the inventors realized that, contrary to the teaching of patent application WO 2009/045100, the size of the aragonite crystals after adsorption of the phosphonates is larger and that there is no longer production of fines, which greatly improves the agglomeration and thus the efficacy of the method. The particles thus obtained are therefore sufficiently dense and coarse to be separated by gravity.

Finally, the use of pH conditions between 8 and 9.2 combined with the use of a reactor with a high solid content (between 20 and 800 g/l) and integrated liquid-solid separation, as described, for example, in patent application WO 2013/15022, makes it possible to maintain the in situ formation of calcium carbonate in aragonite form in sufficient amount to remove the phosphonate-type precipitation-inhibiting products.

The present invention thus relates to a method for treating an aqueous liquid effluent containing calcium and carbonate ions and containing precipitation-inhibiting products, comprising the following successive steps:

a) providing an aqueous liquid effluent supersaturated with $CaCO_3$ and containing precipitation-inhibiting products;

b) having the effluent obtained in step a) pass into a reactor with high solid content with a solid content maintained between 20 and 800 g/l and integrated solid-liquid separation, at a pH comprised between 8 and 9.2, advantageously between 8.4 and 9, allowing in a single step precipitation in situ of the aragonite polymorph of calcium carbonate and removal of the precipitation-inhibiting products;

c) recovering an aqueous liquid supernatant containing a suspended solids content of less than or equal to 0.1% of the solid content in the reactor (the suspended solids content of the reactor being maintained between 20 and 800 g/l, advantageously between 25 and 200 g/l), advantageously a suspended solids content of less than 50 mg/l, the precipitation-inhibiting products being phosphonates.

For the purposes of the present invention, the term "aqueous liquid effluent" means any water-based liquid. In the case of the present invention, this effluent must contain calcium and carbonate ions dissolved in the effluent, advantageously in a content of between 50 and 1500 for calcium and between 200 and 2000 mg/l for carbonate. Advantageously, the calcium and carbonate ions are present in the form of inorganic salts, for instance calcium carbonate ($CaCO_3$). The effluent may also comprise other inorganic ions such as chlorides, boron, magnesium, sulfate, barium, silicon, fluoride, strontium, cesium and/or phosphate and/or metals (for instance Fe, Al, Mn, Pb, Sn, As, Zn, Se, Cu, Ni, Ag, Co and/or Mo). Advantageously, it does not comprise any sodium chloride in the case where the membrane method of step ii) is a reverse osmosis method. The effluent may also contain organic compounds. It may, for example in the case where the membrane method of step ii) is a reverse osmosis method, contain contents of less than 50 mg/l of organic matters and, for example in the case where the membrane method of step ii) is a nanofiltration method, contain contents of less than 1 g/l of organic matters.

The effluent according to the invention also comprises precipitation-inhibiting products that it is desired to remove. These are phosphonates. Their concentration is expressed and measured in $P-PO_4$ (contained in the precipitation-inhibiting products) and may range between 0.5 and 40 mg/l.

For the purposes of the present invention, the term "phosphonate-type precipitation-inhibiting products" means any phosphonate which makes it possible to increase the content of inorganic salts in an aqueous liquid effluent beyond their solubility limit without bringing about their precipitation (for instance calcium and carbonate ions without precipitation of $CaCO_3$). Advantageously, they are phosphonates chosen from sodium hexametaphosphonate (SHMP), 1-hydroxyethylidene-1,1-disphosphonic (HEDP), 2-phosphonobutane-1,2,4-tricarboxylic acid (PBTC), aminotrimethylenephosphonic acid (ATMP), hexamethylenediaminetetramethylenephosphonic acid (HDTMPA), DTPMPA (diethylenetriaminepenta-methylenephosphonic acid), BHMTPMPA (bis(hexamethylenetriaminepenta)-methylenephosphonic acid) and mixtures thereof. Advantageously, the phosphonates are chosen from aminotrimethylenephosphonic acid (ATMP), hexamethylenediaminetetramethylenephosphonic acid (HDTMPA), 1-hydroxyethylidene-1,1-disphosphonic (HEDP), and mixtures thereof.

The liquid aqueous effluent containing carbonate and calcium ions and precipitation-inhibiting products may stem from industrial (waste water or "process" water), municipal (waste water or drinking water) and/or underground water into which were added precipitation-inhibiting products; In particular this is waste water or industrial water.

In particular, this industrial water stems from the mining, metallurgical and/or chemical industry. Mining effluents have, for example, compositions of dissolved inorganic salts ranging between 2 and 12 g/l, in particular from 4 to 12 g/liter.

In the context of the present invention, the effluent of step a) is also supersaturated in $CaCO_3$, i.e. the content of solutes (in this case $Ca^{2+}$ and $CO_3^{2-}$) is greater than the solubility limit of the dissolved salt (in this case $CaCO_3$). This also means that the supersaturation index of said salt is greater than 1 (this representing the effective concentration of salt present in solution over the solubility of said salt at equilibrium). The product of the concentrations of the species in solution is then greater than the solubility product of the salt from which they are derived (in this case $CaCO_3$). This effluent may also be supersaturated in calcium sulfate ($CaSO_4$).

In order to obtain an effluent supersaturated in $CaCO_3$ and containing precipitation-inhibiting products according to step a) of the method according to the present invention, it is possible to concentrate an effluent containing calcium and carbonate ions beyond the solubility limit of $CaCO_3$, for example by means of a membrane treatment or evapo-concentration, advantageously by means of a membrane treatment, and using precipitation-inhibiting products to prevent the precipitation of these chemical species.

Advantageously, step a) of the method according to the present invention comprises the following successive steps:
i) providing an aqueous liquid effluent containing calcium and carbonate ions and precipitation-inhibiting products;
ii) concentrating the effluent obtained in step i) in calcium and carbonate ions until $CaCO_3$ supersaturation by a membrane treatment method;
iii) recovering the $CaCO_3$ supersaturated effluent containing the precipitation-inhibiting products.

The membrane method of step ii) according to the present invention may be a method of direct osmosis, reverse osmosis (RO), electrodialysis, nanofiltration (NF) or membrane distillation, advantageously a method of direct osmosis, reverse osmosis, electrodialysis or nanofiltration, more particularly reverse osmosis or nanofiltration. The effluent recovered in step iii) is then the concentrate from the membrane treatment method.

In a particular embodiment, the liquid aqueous effluent of step i) stems from industrial (waste water or "process" water), municipal (waste water or drinking water) and/or underground water into which were added precipitation-inhibiting products; in particular this is waste water or industrial water.

In particular, this industrial water stems from the mining, metallurgical and/or chemical industry. The mining effluents have, for example, compositions of dissolved salts ranging between 2 and 12 g/l, in particular from 4 to 12 g/liter.

During step b) of the method according to the present invention, there is precipitation of calcium carbonate in the form of its aragonite polymorph, which will trap the precipitation-inhibiting products which become adsorbed onto the surface of the calcium carbonate particles. The adsorption rate is greatest for the aragonite polymorphic form of calcium carbonate. Calcium carbonate can only precipitate in this form on condition that the pH is controlled and is between 8 and 9.2. The inventors realized that at a pH below 8, there is no formation of the correct polymorph of calcium carbonate. In addition, it is not advantageous to increase the pH beyond 9.2, since this will not improve the degree of trapping of precipitation-inhibiting product of the precipitated calcium carbonate, while at the same time necessitating the addition of compounds to increase the pH, which is economically and ecologically unviable. This precipitation thus removes the precipitation-inhibiting products present in the effluent, which facilitates the precipitation of the other inorganic ions that may be present in the effluent. The reactor used in step b) of the method according to the present invention is thus a reactor with a high solid content having a solid content maintained at between 20 and 800 g/l and integrated solid-liquid separation. It is in particular the reactor described in patent application WO 2013/150222. This reactor thus consists of a water treatment device comprising a mixing tank equipped with an inlet line for the effluent to be treated originating from step a) or from step iii), an optional reagent inlet line, a source of stirring capable of inducing turbulent stirring in a given volume of this tank, an extraction line for removing reaction products, and a line for extracting the treated effluent obtained in step c), also comprising, above the inlet line for the effluent to be treated and the optional reagent inlet line, and above and adjacent to the given volume, but below the outlet line for the treated effluent, a tranquilization structure consisting of a plurality of passage channels running from bottom to top and configured in a chicane such that no particle can pass through this layer following a rectilinear trajectory, whereas the fluid veins leaving this tranquilization structure form the treated effluent. Thus, in the reactor that may be used in step b) of the method according to the present invention, there is an adjacent combination of a turbulent mixing zone and a layer formed from channels configured in a chicane. In addition, in the reactor that may be used in step b) of the method according to the present invention, there is no decanter in addition to the tranquilization structure.

The notion of a passage configured in a chicane may cover a wide variety of configurations; thus, it may be undulations in a given plane, in practice vertical when the tranquilization layer is placed in a device according to the invention, which corresponds to a particularly simple geometry. It may also be helical chicanes, which corresponds to undulations in the three dimensions of space. In addition, irrespective of the configuration (in two dimensions or in three dimensions) of the chicanes, the channels may have a substantially constant cross section, or, on the contrary, may have fluctuations of cross section, either in a single direction (increasing from bottom to top, or the opposite), or with increases and decreases. In any case, the chicanes present at least a direction change in the plane. For reasons of ease of construction, the chicaned channels are advantageously delimited by flat walls, which optimizes the use of the volume of the tranquilization layer (each wall delimits two channels). In other words, the channels are advantageously formed from a succession of rectilinear segments. These flat walls are in practice smooth. The channels advantageously comprise at least two segments that are inclined relative to the horizontal, contiguous or optionally separated by a vertical segment. In practice, the transverse dimensions of the channels are less than 20 cm, for example of the order of 4 to 10 cm.

The mixing zone may comprise mechanical elements contributing toward guiding the circulation of the effluent and of the reagents therein; it is advantageously a central tube guiding the stream in a preferably descending direction, and bringing about dispersion of the stream at the bottom; it may be a stream guide in accordance with the teaching of document FR 2 863 908 (or U.S. Pat. No. 7,648,638).

The turbulence in the upper zone is advantageously less in a ratio of at least 10 than the turbulence of the effluent charged with reaction products located immediately below the tranquilization layer. Thus, according to preferred features of the invention, optionally combined:

the channels are configured in a chicane parallel to the same plane, which corresponds to a configuration that is simple to manufacture, and thus of moderate cost; as a variant, the channels are configured in a chicane following several transverse directions, which contributes toward better tranquilization; in such a case, the channels are advantageously configured in a spiral, the channels have a constant cross section from the lower face of the structure up to its upper face, which corresponds to great ease of manufacture; however, as a variant, the channels have a cross section that varies over at least part of the height of the tranquilization structure, which contributes toward improving the tranquilization effect due to the local variation in speed thus induced, the channels have an inclination of between 35° and 85° relative to the horizontal, which is seen to lead to tranquilization structures that are reasonable at the industrial scale.

Advantageously, for reasons especially of feasibility, the tranquilization structure is formed of superposed layers in which the channels are formed from rectilinear portions. In this case, the tranquilization structure advantageously comprises at least two layers in which the channel portions are inclined relative to the horizontal, in different directions. These two layers comprising portions that are inclined relative to the horizontal may be separated by a layer in which the portions are vertical. Also advantageously for reasons of manufacture, the inclined portions have the same inclination relative to the horizontal in at least two layers (in the same plane (in opposite directions), or not). Preferably, the channels have a variable cross section in at least one of the superposed layers.

Whether or not the channels have a constant cross section, it is advantageous for the channels to be formed by flat walls. Preferably, the device advantageously comprises a stream guide around the stirring source. The tranquilization structure is then advantageously located a distance from the base between 50% and 100% of the sum (2H+D) if H is the height of the stream guide and D is the hydraulic diameter. The hydraulic diameter is by definition equal to 4× wet surface area/wet perimeter. The reactor may have a square or circular base. For a reactor with a cylindrical base, the hydraulic diameter is the diameter and for a reactor with a square base, it is the length of a side.

When the stirring in the stream guide is downward, it is advantageous for the injection of the effluent to be treated (and also the reagents, especially in the case of a precipitation treatment) to take place between this stream guide and the tranquilization structure, in practice opposite the top inlet of this stream guide. Advantageously, with or without a stream guide, the tranquilization structure is located above the base of the tank between 0.25 and 3 times (and preferably between 0.5 and 1.5 times) the hydraulic diameter of the tank, which amounts to saying that the mixing volume, under the tranquilization layer, has a height that is of the same order of magnitude as its width (in practice the hydraulic diameter), which contributes toward establishing the high turbulence regime up to the immediate proximity of the tranquilization structure.

Thus, in the context of the process according to the present invention, the effluent to be treated (stemming from step a) or from step iii)), is injected into the reactor of step b), i.e. into a tank in a given volume of which turbulent stirring is induced, this effluent in which precipitation has been brought about is circulated from the bottom to the top through a tranquilization structure located above and adjacent to this given volume and consisting of a plurality of passage channels running from bottom to top and configured in a chicane so that no particle can pass through this layer along a rectilinear trajectory, whereas the fluid veins leaving this tranquilization structure form the treated effluent which is extracted at a level above this structure (effluent of step c)), whereas sludges are extracted at a bottom part of said given volume.

The solid content in the reactor of step b) is maintained between 20 and 800 g/l of suspended solids, advantageously between 20 and 450 g/l and more advantageously between 25 and 200 g/l. In particular, the solid content in the reactor of step b) may be maintained between 50 and 450 g/l. This solid content may be measured in situ by a probe for measuring suspended solids (SS) or by regular sampling and measurement of the SSs on these samples.

In another advantageous embodiment, the hydraulic residence time (HRT) in the reactor of step b) is comprised between 3 mins and 2 hours; it is advantageously 30 minutes for gypsum. The hydraulic residence time is obtained by the equation: HRT=V/Q with V=reactor volume of step b) and Q=feed rate of the reactor with effluent of step a).

It is generally not necessary to seed the reactor of step b) in order to obtain precipitation of the calcium carbonate in the form of its aragonite polymorph. Specifically, the crystallization may take place spontaneously in the light of the pH used and due to the fact that the effluent to be treated is supersaturated in $CaCO_3$. However, in another advantageous embodiment, the reactor of step b) is seeded with crystals of the aragonite polymorph of calcium carbonate. This makes it possible to start the precipitation with the correct calcium carbonate polymorph during the startup of the method. Once the precipitation has started, i.e. the startup has taken place, it is no longer necessary to add crystals of the aragonite polymorph since the precipitation is self-maintained by means of the effluent supersaturated in $CaCO_3$, at the pH used (between 8 and 9.2, in particular between 8.4 and 9) and due to the disappearance from the aqueous medium of the precipitation-inhibiting products which prevented the precipitation of the inorganic salts.

By virtue of the method according to the present invention, a liquid aqueous effluent containing very little suspended solids and having a content of precipitation-inhibiting products that is so low that they can no longer act as precipitation-inhibiting product is recovered in step c); advantageously, at least 90% by weight of the precipitation-inhibiting products have been removed from this effluent. The pH of this effluent is generally between 8 and 9.2, in particular between 8.4 and 9. This effluent may also contain carbonate and calcium ions, but in contents lower than the supersaturation with $CaCO_3$.

Since the precipitation of the correct polymorph of calcium carbonate (the aragonite polymorph) is more efficient at a pH of between 8 and 9.2, in particular between 8.4 and 9, the method according to the present invention may comprise between steps a) and b) or between steps iii) and b) a step α) of adjusting the pH of the effluent obtained in step a) or in step iii) to a pH of between 8 and 9.2, in particular between 8.4 and 9, advantageously using a base such as sodium hydroxide or an acid such as HCl, in particular sodium hydroxide. Specifically, the pH of the effluent obtained in step iii) or of the effluent of step a) is generally between 5 and 10.

In a particular embodiment, the method according to the present invention comprises an additional solid/liquid separation step d) applied on the aqueous liquid supernatant obtained in step c), advantageously by filtration on a ceramic or organic membrane, so as to recover the aqueous liquid effluent. This step in fact makes it possible to recover an aqueous liquid effluent freed of all trace of suspended solids (SS) that may possibly still be present in the effluent obtained in step c) of the method according to the present invention.

The aqueous liquid effluent obtained in step c) or optionally step d) may be recycled, i.e. added to the initial effluent entering the membrane treatment method of step ii), which makes it possible to improve the total conversion rate of this membrane treatment method. The conversion rate corresponds to the flow of permeate produced by the membrane treatment method of step ii) versus the flow of effluent entering the membrane treatment method (step i): thus 100×(Qpermeate/Qfeed).

Thus, the method according to the present invention may comprise an additional step e) for injection of the liquid effluent obtained in step c) or of a portion or the totality of the effluent obtained in step d) into the effluent of step i).

By means of this recycling and if the membrane treatment method of step ii) is nanofiltration (NF) or reverse osmosis (RO), the conversion rate of the method containing steps i), ii), iii), b), c) and e) and optionally d) and/or α) is greater than or equal to 95%.

Moreover, a fraction of the concentrate obtained during the solid-liquid separation of step d) may be conveyed into the reactor of step b) or into an intermediate tank in order to ensure a purging rate of the solid/liquid separation membrane when it is a membrane unit that is used.

The advantage of the method according to the present invention is that it is not necessary to add any flocculating agent or any coagulating agent to promote the precipitation during step b) of the method according to the present invention, and in particular to obtain such a conversion rate.

Thus, advantageously, the method according to the present invention is characterized in that no coagulating agent or flocculating agent is used.

To further improve the conversion rate, it is possible to recover water, which may optionally be recycled from the sludges extracted from the reactor of step b). These sludges contain crystals of precipitated calcium carbonate and the precipitation-inhibiting products, and also all the other inorganic salts that have precipitated at the same time as the calcium carbonate in the reactor, for instance calcium sulfate $(Ca(SO_4)_2\ 2H_2O)$, fluoride ions, $PO_4^-$, Sr, Si and metals. They also contain interstitial water which it would be advantageous to recover.

Thus, in a particularly advantageous embodiment, the method according to the present invention comprises an additional step f) for obtaining interstitial water by a liquid-solid separation method, advantageously by dehydration, for example by simple draining, from sludge containing the crystals extracted from the reactor of step b), advantageously all or part of the interstitial water obtained in step f) being recycled in a step g) by injection into the effluent of step e) or step i), the possible non-recycled interstitial water being purged in a step h).

Advantageously, the effluent totally or partially purged in step h) allows the conversion rate of the method to be controlled. Specifically, depending on the amount of effluent purged, the rest being recycled in step g), the conversion rate of the method may be increased or decreased. This conversion rate may even be up to 100% if all of the interstitial water (effluent of step f)) is recycled.

In yet another particular embodiment, the method according to the present invention comprises an additional step for adjusting the pH in i) or e) or upstream of ii) to a pH <7.5, advantageously lowering the pH by using, for example, acid such as $H_2SO_4$ or HCl, of the effluent of step a) and/or of the effluent of step i) and/or of the effluent of step d) and/or of the effluent of step e). This pH adjustment thus makes it possible to descend below a threshold at which the risks of clogging with $CaCO_3$ on the membranes used in the membrane treatment method is very small or even virtually zero. Moreover, it also makes it possible to decrease the content of precipitation-inhibiting products required upstream of the concentration step.

In another advantageous embodiment, the method according to the invention comprises a step d) and step e) consists in only injecting a portion of the effluent obtained in step d) into the effluent of step i), the portion of the non-injected effluent being purged in a step k).

Advantageously, the effluent purged during step k) allows the conversion rate of the method to be controlled. Specifically, depending on the amount of effluent purged, the rest being injected into step i), the conversion rate of the method may be increased or decreased.

In another advantageous embodiment, the membrane method of step ii) of the method according to the invention is a nanofiltration method allowing desaturation into divalent compounds and not into monovalent compounds (such as NaCl), the permeate from the nanofiltration method of step ii) being treated in a step iii) by a reverse osmosis concentration or evapoconcentration method, preferentially by reverse osmosis, with which it is possible to reach a conversion rate of the method of at least 95%.

Advantageously, the concentrate from step iiii) allows the conversion rate of the method to be controlled. Specifically, depending on the amount of concentrate, the conversion rate of the method may be increased or decreased.

In a particular embodiment, the method according to the present invention is a continuous method. Indeed, the fact that the method according to the present invention is continuous will allow a better control of the type of calcium carbonate polymorph which precipitates in the reactor of step b), since this will allow the growth of the crystals of the aragonite polymorph and therefore its precipitation.

The invention will be understood more clearly in the light of the description of the figures and of the examples that follow.

FIG. 11 represents an image obtained with a scanning electron microscope at the 10 μm scale of calcium carbonate particles serving for seeding according to Example 4 (synthetic $CaCO_3$.

Figure 13:
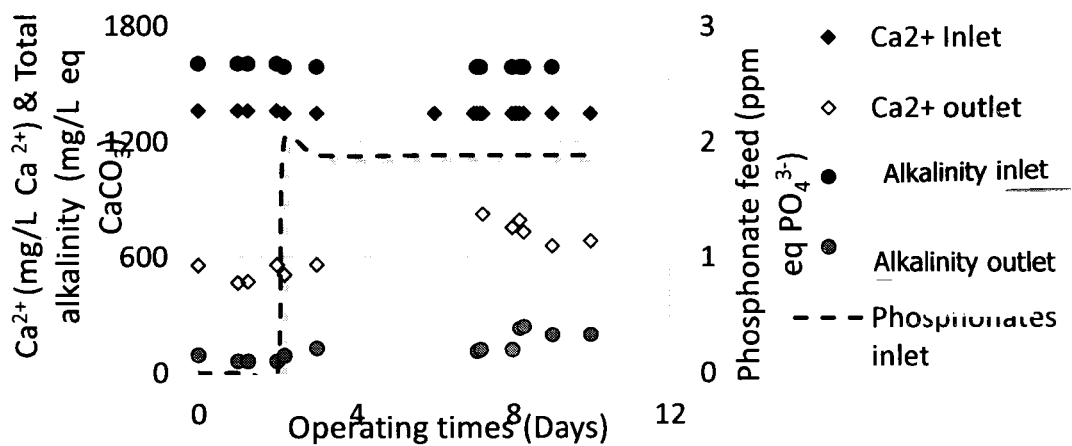

FIG. 13 represents the measurement of the content of calcium ions (in mg/L) at the reactor inlet and in the supernatant (reactor outlet), the total alkalinity (in mg/L equivalent of $CaCO_3$) at the reactor inlet and in the supernatant (reactor outlet) and the phosphonate content (in ppm equivalent of $PO_4^{3-}$) at the reactor inlet as a function of the number of days of operating of the method, no phosphonate having been injected during the first two days of operating, in the context of the implementation of the method according to Example 5.

Figure 14:
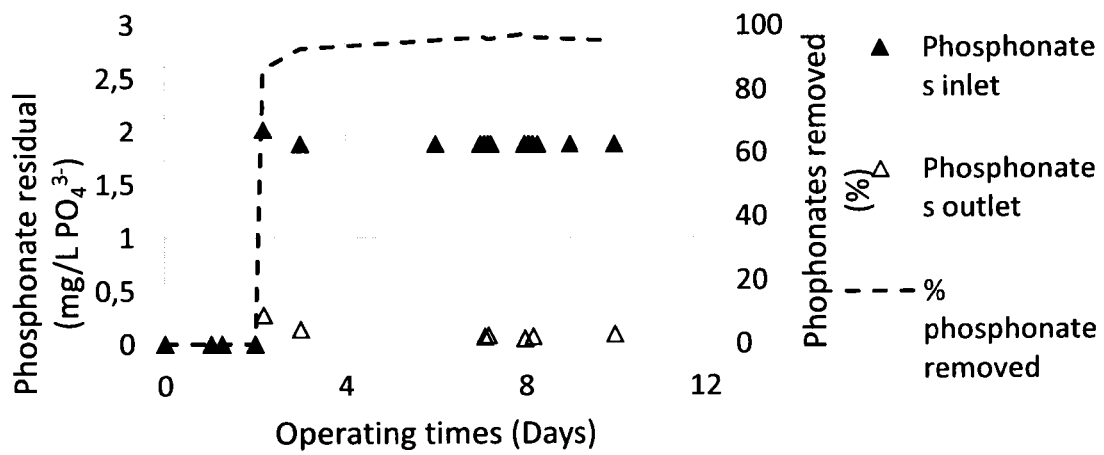

FIG. 14 represents the measurement of the content of residual phosphonate (in mg/L $PO_4^{3-}$) at the reactor inlet and in the supernatant (reactor outlet) and the percentage of phosphonate removed (in %) as a function of the number of days of operating of the method, no phosphonate having been injected during the first two days of operating, in the context of the implementation of the method according to Example 5.

Figure 15:
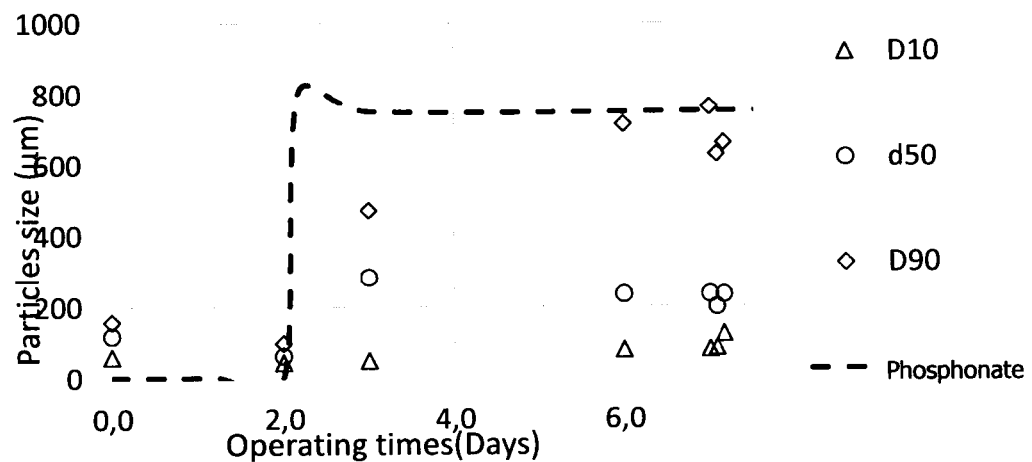

FIG. 15 represents the measurement of the particle size (in μm) by analysis via Beckmann laser granulometry for obtaining the particle size distribution of the particle suspension: D10 (D10 is the size distribution diameter of the finest particles, i.e. 10% by volume of the particles have a diameter less than this diameter and 90% by volume of the particles have a diameter greater than this diameter), D50 (D50 is the median size distribution diameter of the particles, i.e. 50% by volume of the particles have a diameter smaller than this diameter and 50% by volume of the particles have a diameter greater than this diameter) and D90 (D90 is the size distribution diameter of the coarsest particles, i.e. 90% by volume of the particles have a diameter smaller than this diameter and 10% by volume of the particles have a diameter greater than this diameter) as a function of the number of days of operating of the method, no phosphonate having been injected during the first two days of operating, and 1.8 mg/l of phosphonate expressed as P-PO4, being injected thereafter, in the context of the implementation of the method according to Example 5.

Figure 16A:
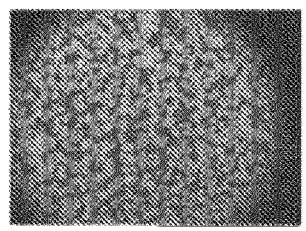
Figure 16B:
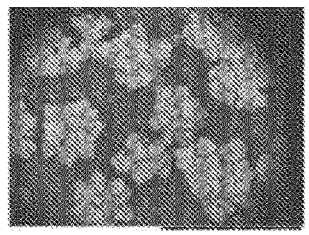
Figure 16C:
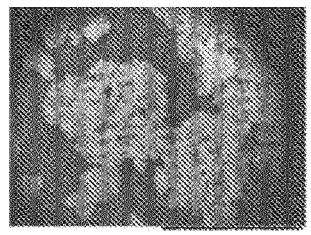

FIG. 16 represents an image obtained with a scanning electron microscope at the 1 mm scale of calcium carbonate particles in the reactor of Example 5: FIG. 16A: at the start; FIG. 16B: after 2 days of operating; FIG. 16C: after 7 days of operating.

Figure 17:
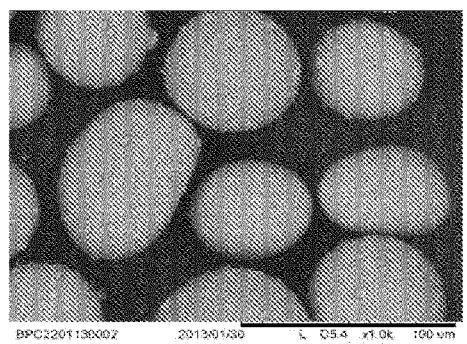

FIG. 17 represents an image obtained with a scanning electron microscope at the 100 μm scale (FIG. 17A) and 30 μm (FIG. 17B) of the precipitated calcium carbonate particles in the reactor in the context of the method according to Example 6.

Figure 18:
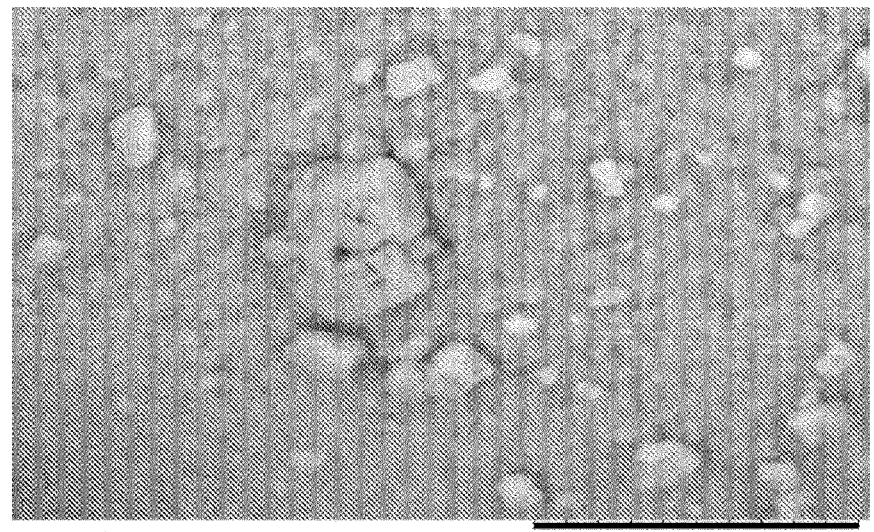

FIG. 18 represents an image obtained with a scanning electron microscope at the 10 μm scale of the surface of the precipitated calcium carbonate particles in the reactor in the context of the method according to Example 6.

Figure 19:
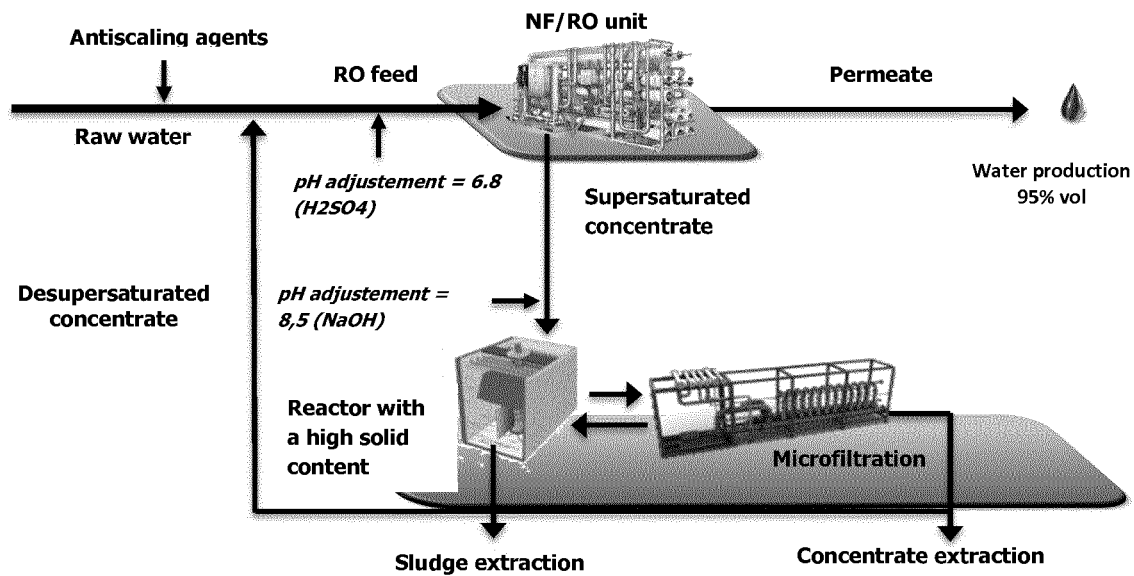

FIG. 19 represents a scheme of the method (line) used in Example 7.

Figure 20:
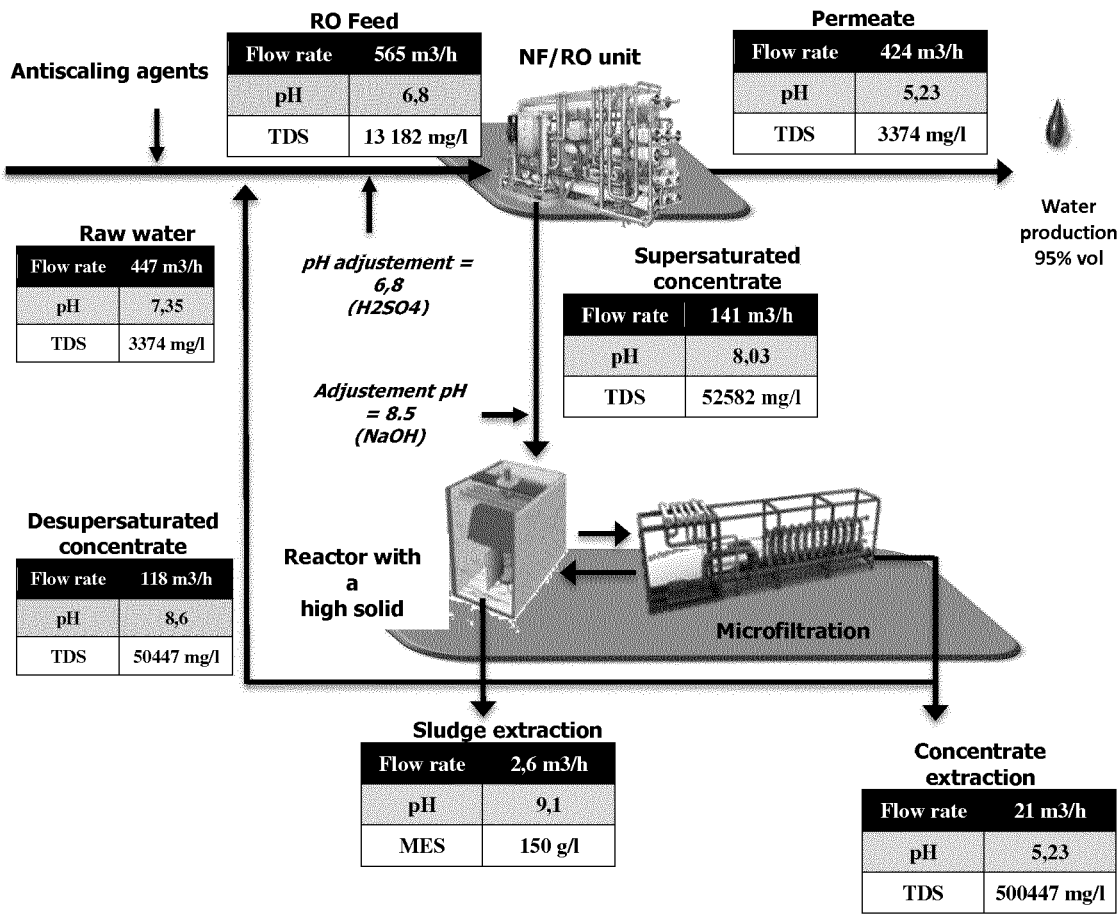

FIG. 20 represents the scheme of the method (line) used in Example 7 with the simulated flow rate, pH, SC (solid content) and SSM data.

Figure 21:
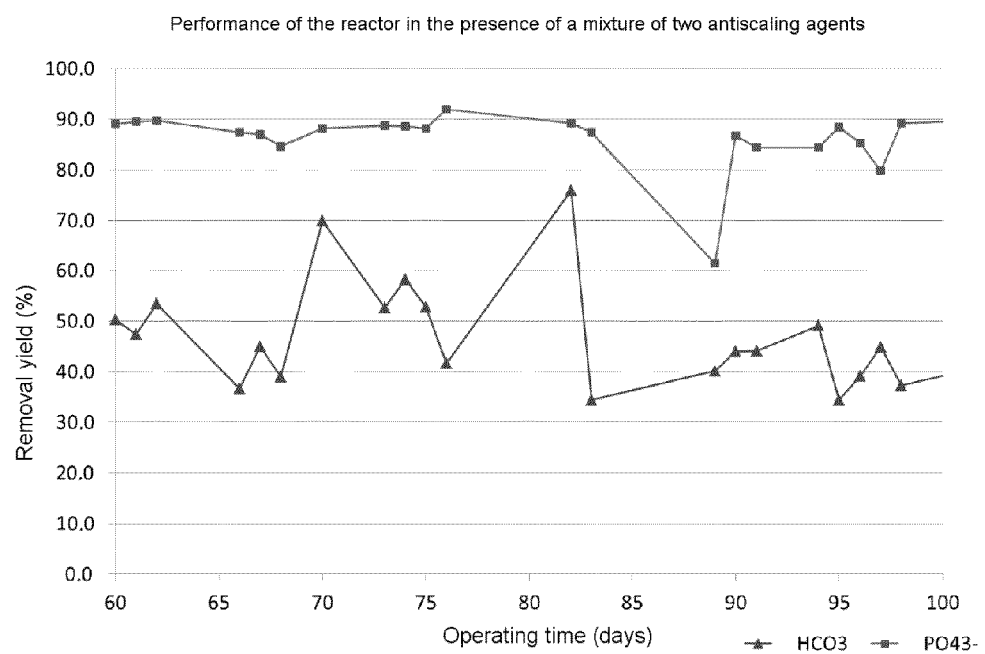

FIG. 21 represents the decrease over time of the ATMP and HDTMA mixture (% of removal of $PO_4^{3-}$) used as precipitation-inhibiting product and of removal of $HCO_3$ in the context of the method according to Example 7.

Batch tests made it possible to demonstrate the possibility of spontaneous desaturation of solution in the presence of a high solid content by trapping the precipitation-inhibiting products on the crystals in suspension.

In point of fact, to increase the suspension rate of the membrane lines, in particular reverse osmosis (RO) and nanofiltration (NF), desupersaturation may be used between two stages. Upstream of the NF or RO equipment, precipitation-inhibiting products are added so as to prevent the formation of insoluble precipitates. To precipitate the salts and thus achieve the solubility of a solution, the precipitation-inhibiting products must be inhibited or removed.

Comparative Example 1

Preliminary studies of this question were conducted on a concentrate of first step of nanofiltration (NF) originating from a metallurgical site, i.e. an industrial effluent obtained after a nanofiltration membrane treatment. This effluent is supersaturated with $CaSO_4$ and contains precipitation-inhibiting products consisting of a mixture of ATMP and HDTMPA with a corresponding content of phosphonates of 1.5 ppm which inhibit the precipitation of the supersaturation salts ($CaSO_4$). The reagents tested have the purpose of accelerating this rate of precipitation reaction inhibited by the precipitation-inhibiting products.

The following table summarizes the results obtained in terms of time required and of amounts of chemical reagents to initiate the precipitation reaction of the supersaturation compounds ($CaSO_4$), i.e. the induction time. The tests performed are laboratory tests based on the addition of said reagents in the concentration indicated into beakers containing the effluent with stirring for the time indicated.

| Method | Time & consumption | Conclusions |
| --- | --- | --- |
| Precipitation with $CaCl_2$ (formation of gypsum) without pretreatment | Stoichiometric conditions: several days With 14 times the stoichiometry: 2.5 h | Low and requires a large amount of chemical reagents |
| Precipitation by formation of ettringite (addition of lime and $Al_2O_3$) | Stoichiometric conditions: several days With 30 times the required dose: 1 h | Low and requires a large amount of chemical reagents |
| Phosphonate oxidation via potassium persulfate + $CaCl_2$ | 40 min | Energy consumption (heating to 120° C.) |
| Phosphonate oxidation with ozonation + $CaCl_2$ | No effect | Not effective |
| Phosphonate complexation with ferric ions + $CaCl_2$ | 1 h | High risk of fouling of the membrane |

Example 2

The first tests were performed at the laboratory scale in batch mode with 2 different NF concentrates $1^{st}$ stage of NF with high contents of sulfates (mine)

Analyses of the NF Concentrate

| | Concentration |
| --- | --- |
| Total phosphorus ($P_{total}$) | <0.5 mgP/L |
| Orthophosphates ($PO_4$) | <2.5 mgP/L |
| Sulfates | 4530 $mgSO_4$/L |
| Total barium | <50 µg/L |
| Calcium ($Ca^{2+}$) | 680 mg/L |
| Total iron | <50 µg/L |
| Potassium | 15 mg/L |
| Magnesium | 520 mg/L |
| Sodium | 570 mg/L |
| Strontium | 11 000 µg/L |
| Alkalinity | 0.0° F. |
| Total alkalinity | 43.1° F. |
| Conductivity (20° C.) | 5.6 mS/cm |
| Chlorides | 55 mg/L |
| pH | 7.90 |
| Turbidity | 0.6 FAU |

An NF concentrate with high contents of carbonates

Analyses of the NF Concentrate with a High Content of Carbonates

| | concentration in (mg/L) |
| --- | --- |
| $Ca^{2+}$ | 485 |
| $Mg^{2+}$ | <10 |
| Alkalinity (eq. $CaCO_3$ mg/L) | 701 |
| $P-PO_4^{3-}$ | <0.05 |
| $P_{total}$ | 0.287 |
| $\Delta P$ | 0.282 |

To evaluate the change of the phosphonates in the effluent, analysis of the total phosphorus ($P_{total}$) and of the phosphates ($PO_4$) is performed. The phosphonate content is considered as being proportional to the difference between the concentrations of total P and $PO_4$ ($\Delta P$ in the table).

Figure 1:
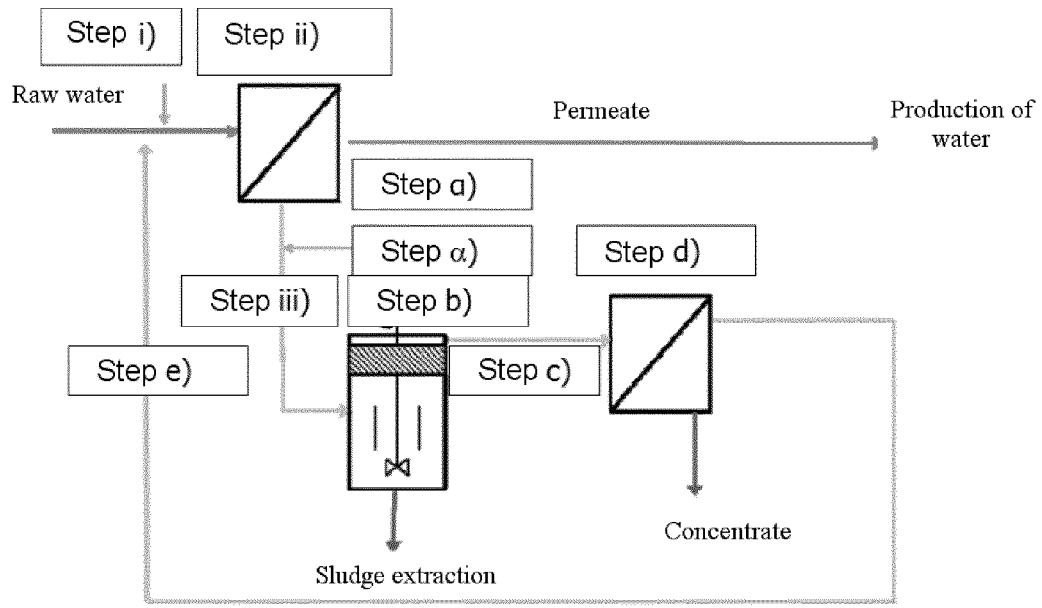
FIG. 1 represents the scheme of a device for performing the method according to the present invention in which steps i), ii), iii), α), a), b), c), d) and e) are represented.
Figure 2:
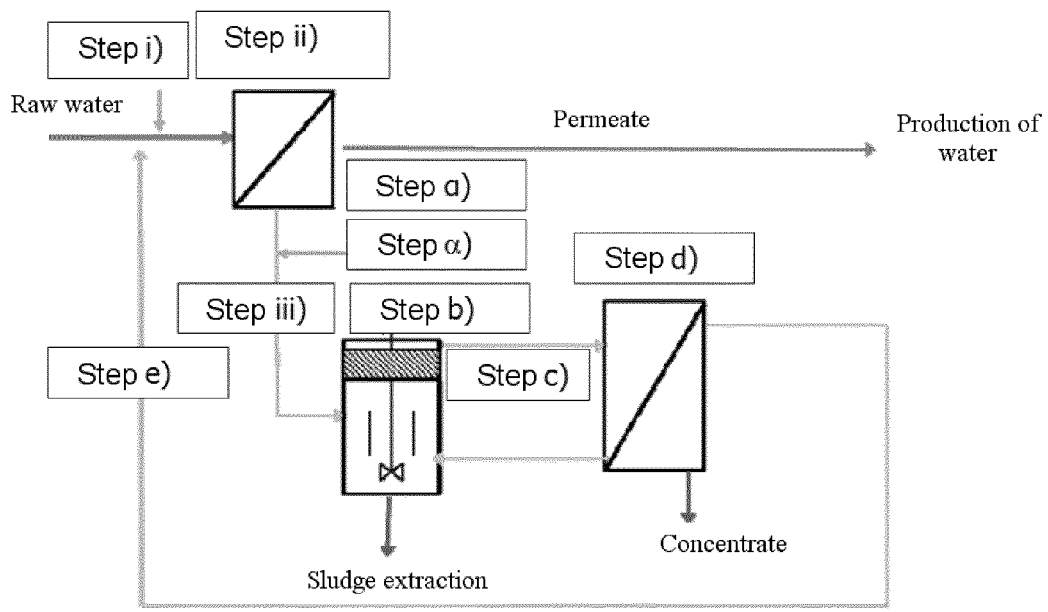
FIG. 2 represents a 2$^{nd}$ scheme of a device for performing the method according to the present invention in which steps i), ii), iii), α), a), b), c), d) and e) are represented.
Figure 3:
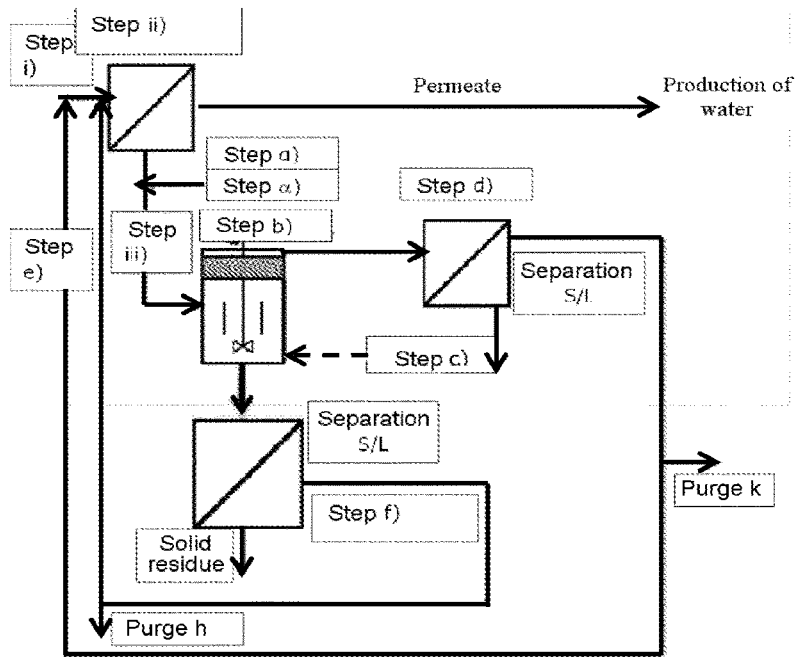
FIG. 3 represents the scheme of a 3$^{rd}$ device for performing the method according to the present invention in which steps i), ii), iii), α), a), b), c), d), e), f), k) and h) are represented.
Figure 4:
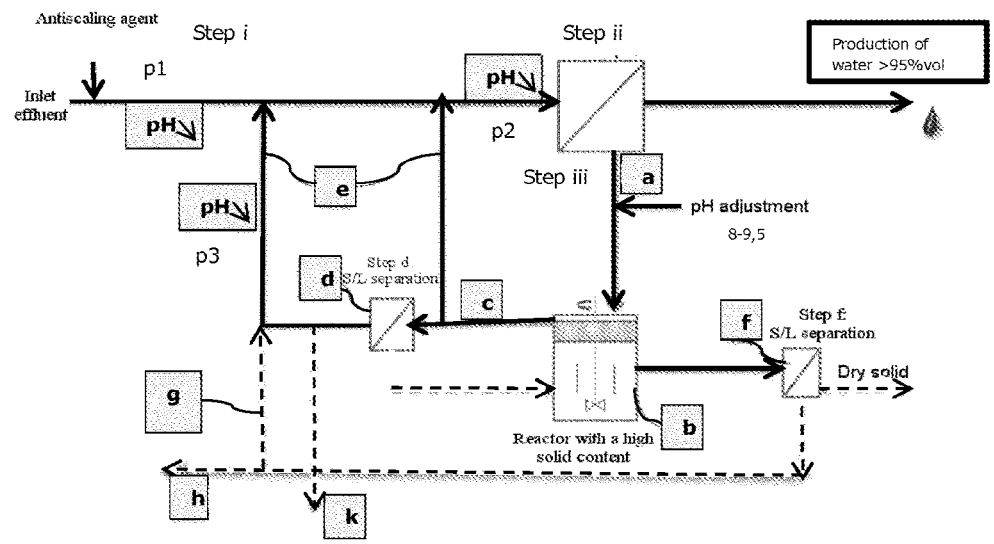
FIG. 4 represents the scheme of a 4$^{th}$ device for performing the method according to the present invention in which steps i), ii), iii), α), a), b), c), d), e), f), k) and h) and the steps for adjusting the pH p1, p2 and p3 are represented.
Figure 5:
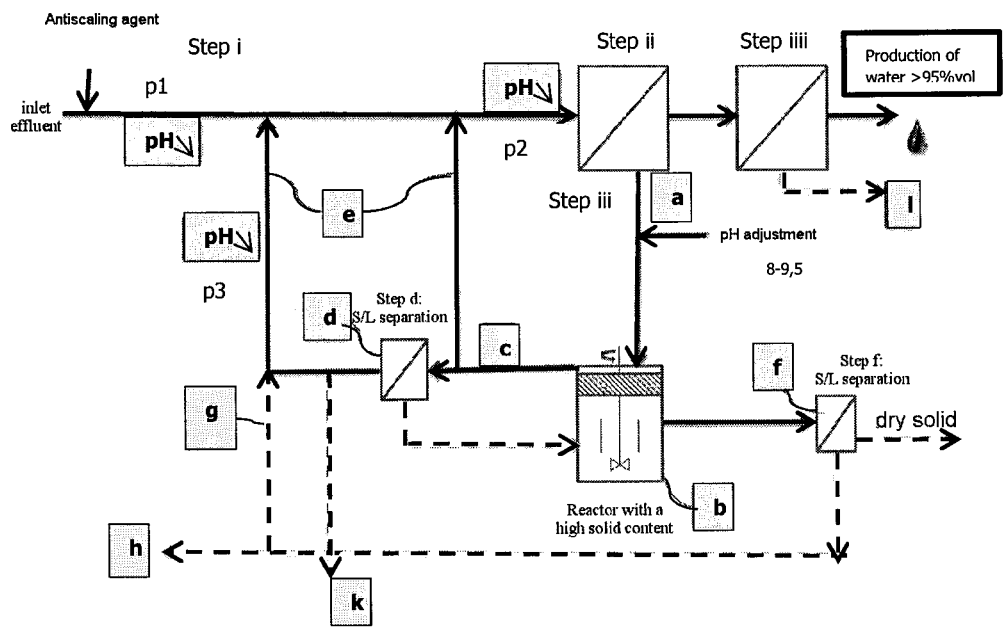
FIG. 5 represents the scheme of a 5$^{th}$ device for performing the method according to the present invention in which steps i), ii), iii), iiii), α), a), b), c), d), e), f), k), g) and h) and the steps for adjusting the pH p1, p2 and p3 are represented.
Figure 6:
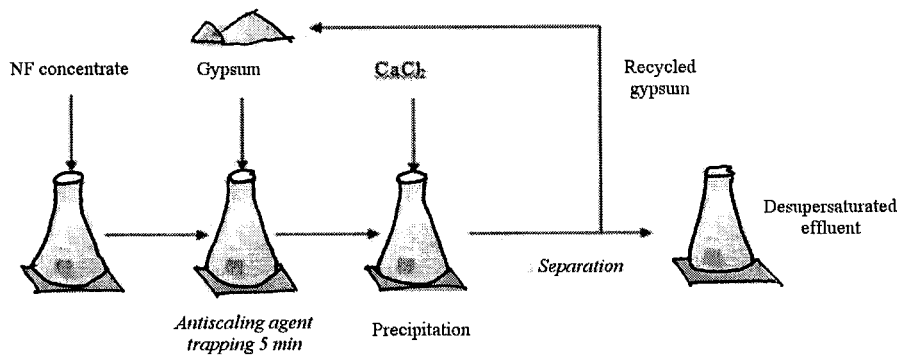
FIG. 6 represents the summary of the principle of the test method of Example 2 on a nanofiltration concentrate with a high content of sulfates (mine).

The principle of this method is illustrated in FIG. 6.

Protocol of the NF Concentrate Method (Sulfates)

This method consists in trapping the precipitation-inhibiting products (mixture of ATMP and HDTMPA with a corresponding content of phosphonates of 1.5 ppm) on solid seeds (identical in nature to the salt inhibited by the action of the precipitation-inhibiting products) and in inducing precipitation by adding $CaCl_2$ to the concentrate in stoichiometric amount. Various amounts of sludges as seed were tested.

Figure 7:
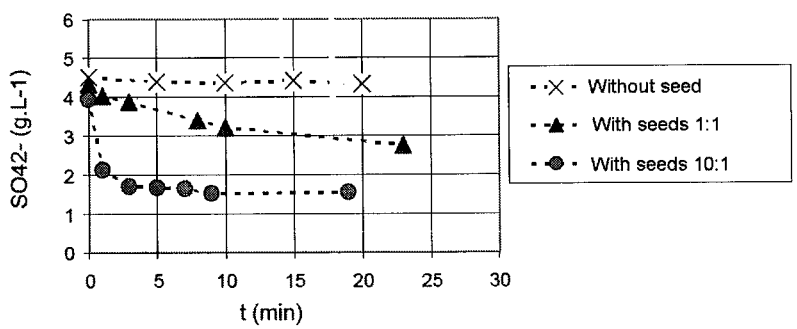
FIG. 7 represents the $SO_4^{2-}$ content (in g/L) as a function of the time (in minutes) in the nanofiltration concentrate with a high sulfate content of Example 2 during the implementation of the method illustrated in FIG. 6 as a function of the amount of seeds used.

The results are represented on the graph in FIG. 7. In this figure, the ratios 1:1 and 10:1 correspond to the solid seed on the amount of solid produced by the reaction.

Equilibrium is reached with a ratio of 10:1. The kinetics are fast with equilibrium reached in 3 minutes.

Figure 8:
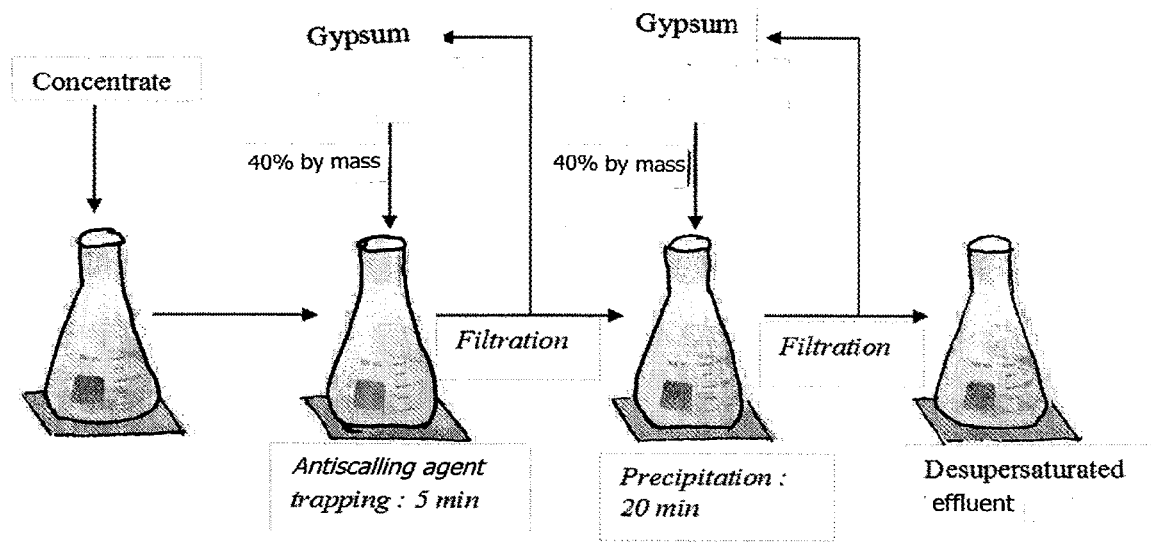
FIG. 8 represents the summary of the principle of the test method of Example 2 on a nanofiltration concentrate with a high content of carbonates.

These tests were later performed on NF concentrates with a high content of carbonate. The precipitation-inhibiting products are first removed by seeding with calcium carbonate particles. Next, desaturation is performed without adding reagents, spontaneously. The protocol is represented in FIG. 8.

The results are collated in the table below.

| | NF concentrate | Desupersaturated concentrate |
| --- | --- | --- |
| $Ca^{2+}$ (mg/L) | 485 | 312 |
| $Mg^{2+}$ (mg/L) | <10 | <10 |
| Alkalinity (eq. $CaCO_3$ mg/L) | 701 | 263 |
| $P-PO_4^{3-}$ (mg/L) | <0.05 | <0.05 |
| $P_{total}$ (mg/L) | 0.287 | <0.05 |
| $\Delta P$ (mg/L) | 0.282 | <0.05 |

The precipitation-inhibiting products were indeed removed and spontaneous desupersaturation takes place without addition of additional reagents.

Comparative Example 3

Thereafter, continuous pilot tests were thus performed. The treated effluent (nanofiltration concentrate) has the characteristics indicated in the table below:

| Parameters | Raw water (NF concentrate) |
|---|---|
| pH | 7.3 |
| Conductivity (mS/cm) | 8 |
| $Ca^{2+}$ (g/L) | 0.8 |
| $Mg^{2+}$ (g/L) | 0.66 |
| $SO_4^{2-}$ (g/L) | 5.9 |
| $SiO_2$ (mg/L) | 38 |
| Phosphonates (mg/L) | 1.7 |
| Total alkalinity (ppm of $CaCO_3$) | 1560 |
| Turbidity (NTU) | <1 NTU |
| Al (μg/L) | <25 |
| Ba (μg/L) | <50 |
| Fe (μg/L) | <50 |
| Mn (μg/L) | <10 |
| Sr (μg/L) | 16 000 |
| K (mg/L) | 19 |
| Na (mg/L) | 760 |
| Cl (mg/L) | 82 |
| F (mg/L) | <1 |
| P (mg/L) | 0.6 |

A synthetic concentrate was used to perform certain tests, with the main ions present as indicated in the table below.

| Parameters | Synthetic effluent |
|---|---|
| $Ca^{2+}$ | 1 g/L |
| $SO_4^{2-}$ | 6 g/L |
| Total alkalinity | 1560 ppm eq. $CaCO_3$ |

The precipitation-inhibiting products (antiscaling agent AS) added are ATMP (1 mg/L of $PO_4^{3-}$) or a mixture of ATMP and of HDTMPA (1.8 mg/L of $PO_4^{3}$). The doses of precipitation-inhibiting product are expressed in phosphate equivalent stemming from the phosphonate analysis. During the tests, the residual precipitation-inhibiting product is expressed as residual phosphonate expressed as mg/L eq $PO_4^{3-}$.

Figure 9:
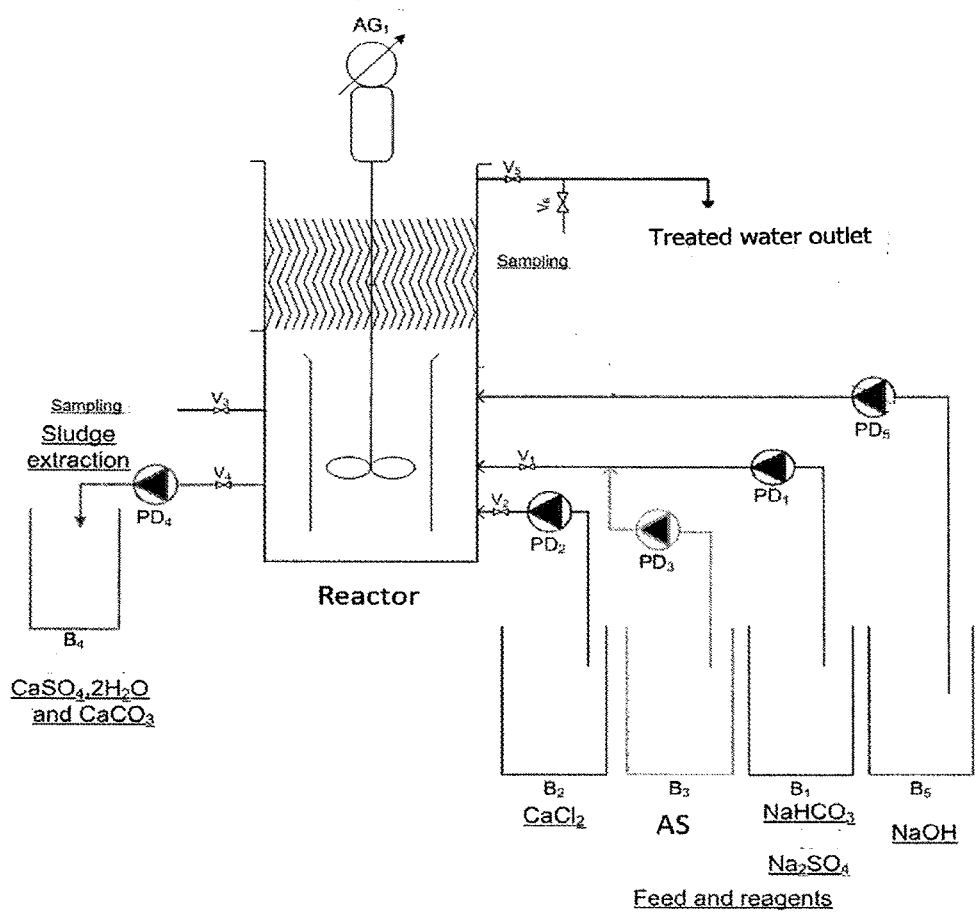
FIG. 9 represents the scheme of the device for performing Comparative Example 3.

The general operating conditions of the continuous tests performed are collated below. Depending on the parameters tested, certain conditions were liable to change from one test to another.
Flow rate: 10 l/h
Reaction time: 30 min
Seeding
  Gypsum
SS target in the reactor: >100 g/L
Stirring speed: 950 rpm
Test time: several days
Compositions (may change depending on the test):
[Total alkalinity]$_{reactor}$=1 594 ppm eq $CaCO_3$
[$SO_4^{2-}$]$_{reactor}$=6 g/L
[$Ca^{2+}$]$_{reactor}$=1 g/L
Precipitation-inhibiting product: phosphonate (e.g. ATMP and HDTMPA at 1.8 mg/L eq $PO_4^{3-}$ of phosphonates)
The diagram of the pilot device is illustrated in FIG. 9. The precipitation unit is a continuous pilot composed of a reactor with a high solid content with a stream guide including a reaction zone and a separation zone integrated into the same unit. Homogenization is performed by a mechanical stirrer. The pH is controlled with a probe on an external loop and the regulation reagents are introduced into the reactor. The control of the solid content in the reactor is performed by an extraction pump coupled to a clock.

Tests in the presence of ATMP and HDTMPA are performed on the test bed with a concentration of suspended solids (SS) of 120 g/l. During these tests, it was observed that after one day of operating, the phosphonates were virtually no longer adsorbed. The calcium and sulfate residuals in overflow were similar to the inlet concentrations (zero decrease). As a result, no solid was formed. The concentration of solid in the reactor was divided by 3, decreasing from 120 g/l to 44 g/l.

Figure 10:
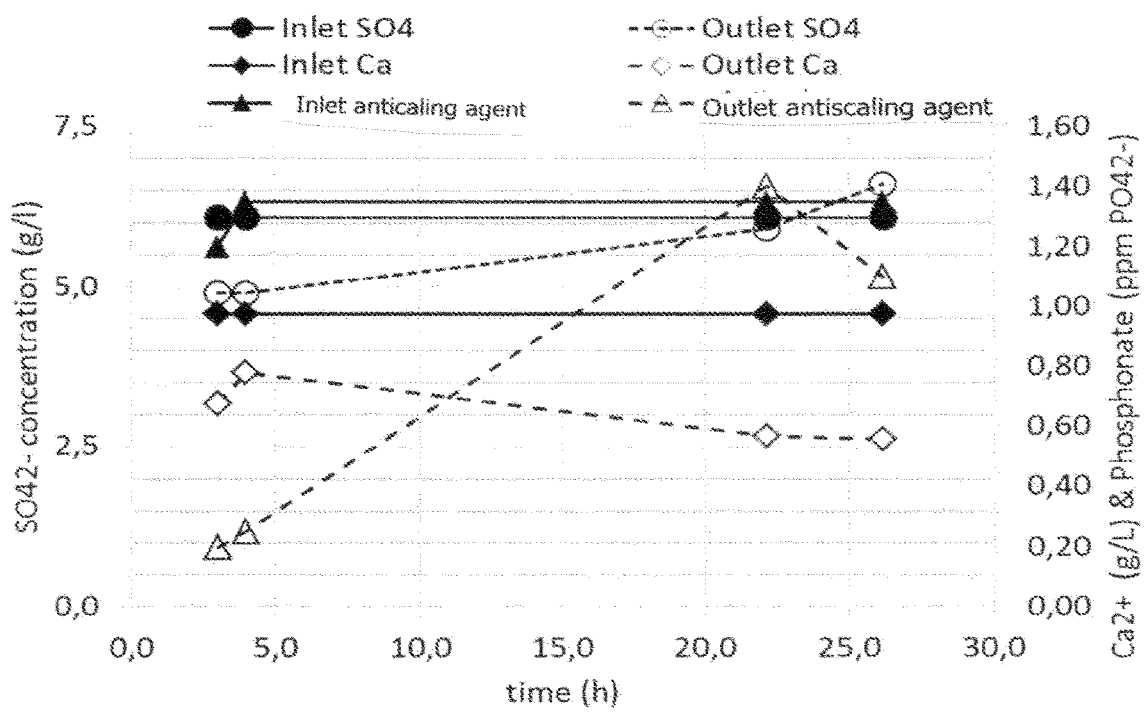
FIG. 10 represents the results for desupersaturation (with seeding of gypsum at 420 g/l) of the synthetic effluent containing $Ca^{2+}$ & $SO_4^{2-}$ (content in g/L) in the presence of precipitation-inhibiting product (antiscaling agents: mixture of ATMP and of HDTMPA in ppm of $PO_4^{2-}$) in the reactor according to Comparative Example 3 as a function of the operating time of the reactor.

After one day of operating, the solid in the reactor no longer makes it possible to retain the precipitation-inhibiting product (antiscaling agent). It is possible to envisage that once the solid is saturated with precipitation-inhibiting product (antiscaling agent), the latter inhibits the precipitation, which entails a reduction in the concentration of solid in the reactor. A test performed with higher concentrations of gypsum in the reactor (up to 420 g/l) confirmed this, as illustrated in FIG. 10.

Specifically, after 4 hours of operating (in the presence of ATMP and HDTMPA~1.3 ppm $PO_4^{3-}$), the residual phosphonate after treatment reaches 0.2 mg/L $PO_4^{3-}$, which confirms the efficacy of phosphonate reduction (~85%). Moreover, the residual concentration of calcium and sulfate leaving the reactor shows that spontaneous precipitation does indeed take place.

However, after 24 hours, the residual phosphonate becomes equal to the inlet content. Since the gypsum which seeded the reactor is saturated and the in situ gypsum production does not allow a sufficient rate of renewal with fresh gypsum to continuously remove the phosphonates.

Example 4

Laboratory tests made it possible to demonstrate the key role of calcium carbonate in the trapping of the precipitation-inhibiting products.

The operating conditions used during the tests are as follows (the conditions being adapted as a function of the test performed):
  precipitation-inhibiting products (antiscaling agents): ATMP+HDTMPA at an equivalent content of $PO_4$ of 2 ppm
  total alkalinity as equivalent $CaCO_3$=1594 ppm
  $Ca^{2+}$=1 g/l
  reaction time: 5 min
  initial pH=7.8
  pH regulation=addition of NaOH (30%)
  $CaCO_3$ $_{synthetic}$=1.5 g/l d50=28.7 μm(analysis with the Beckmann laser granulometer)
  $CaCO_3$ $_{experimental}$=1.5 g/l d50=6.7 μm(analysis with the Beckmann laser granulometer)
  Two types of seeds were tested: commercial lime (calcite: synth. $CaCO_3$) and lime formed experimentally beforehand during tests (exp. $CaCO_3$).

The seeding with synthetic calcium carbonate at pH 8.8 did not allow adsorption of the phosphonates, whereas calcium carbonate originating from the method (experimental) shows that 52% of the phosphonates are adsorbed.

The two types of calcium carbonate do not have the same size distributions, morphology and nature (polymorphism).

Figure 11A:
FIG. 11A and $CaCO_3$ formed beforehand experimentally during the tests.
Figure 11B:
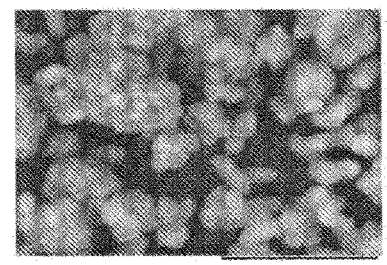
FIG. 11B).

The synthetic calcium carbonate has a calcite form as illustrated in FIG. 11A, whereas the experimental calcium carbonate appears to have more of an aragonite form as illustrated in FIG. 11B.

It was confirmed that the increase in pH had no effect on the phosphonates alone.

The summary conclusion of the laboratory tests is collated in the table below:

|  | Without seeds | | | With $CaCO_3$ seeds | | |
| --- | --- | --- | --- | --- | --- | --- |
|  | pH < 8.4 | 8.4 < pH < 8.5 | pH > 8.5 | pH < 8.4 | 8.4 < pH < 8.5 | pH > 8.5 |
| Precipitation $CaCO_3$ only | No | Yes | Yes | Yes but incomplete | Yes | Yes |
| Adsorption of phosphonates only | No | No | No | No | Yes (only with $CaCO_{3exp}$) | Yes (only with $CaCO_{3exp}$) |
| Precipitation $CaCO_3$ and adsorption phosphonates | No | No | Yes | No | Yes | Yes |

The removal of the phosphonates is explained by the adsorption on the $CaCO_3$ particles (without degradation). The nature of the crystalline form of $CaCO_3$ greatly influences the adsorption rate of the phosphonates onto the crystals. In addition, the pH has an impact on the adsorption rate during the in situ formation of the adsorbent medium.

These tests thus make it possible to demonstrate that the adsorption of the precipitation-inhibiting products necessary for spontaneous precipitation of the supersaturated species is possible only by maintaining the formation of a polymorphic form of $CaCO_3$ which will be dependent on the pH of the reaction.

Figure 12:
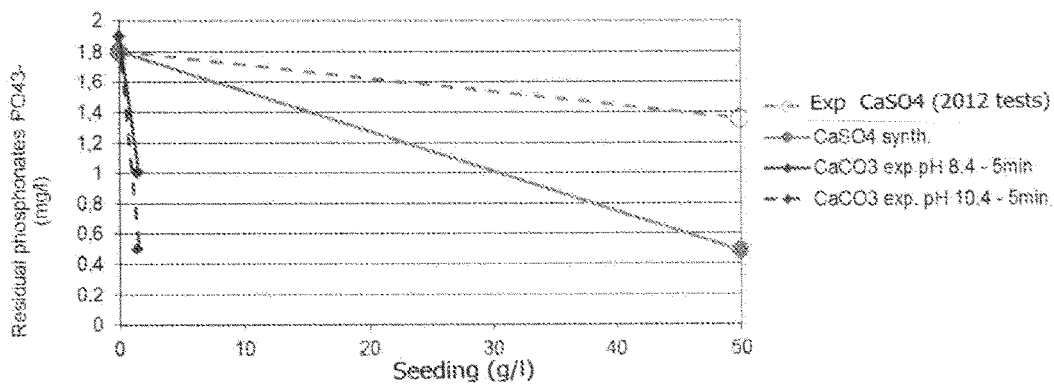
FIG. 12 represents the residual contents of phosphonates ($PO_4^{3-}$ in mg/L) as a function of the amount of seeding (in g/L) and of the type of seeding ($CaCO_3$ or gypsum) and of the pH in the course of the various laboratory tests of Example 4.

The adsorption rates of gypsum and lime during the various laboratory tests are compared in FIG. 12.

Example 5

Following the laboratory tests concerning the adsorption of phosphonates of Example 4, continuous pilot tests were performed at a pH of 8.5 to observe the removal of phosphonates and the precipitation of calcium carbonate.

The diagram of the pilot device is the same as that presented previously in Comparative Example 3 and illustrated in FIG. 9 and the operating procedure is the same as in Comparative Example 3. The operating conditions are as follows:

precipitation-inhibiting product (antiscaling agent): ATMP+HDTMPA at an equivalent content of $PO_4$ of 1.8 ppm total alkalinity: equivalent $CaCO_3$=1594 ppm $Ca^{2+}$=1 g/l the calcium concentration is adjusted by adding $CaCl_2$ reaction time: 30 min regulated pH=8.5 (by adding 3% NaOH solution)

total flow rate: 10 l/h maintenance of a solid content of $CaCO_3$ in the reactor at 20 g/L $CaCO_3$ seeding=20 g/l stirring speed: between 750 rpm and 950 rpm During the first two days of intervention, the precipitation-inhibiting product was not injected so as to study the behavior of the calcium carbonate precipitation at a pH close to 8.5.

Under these working conditions, as may be seen in FIG. 13, about 60% of $Ca^{2+}$ and 90% alkalinity are removed. The precipitation reaction generates 1.7 g/l of $CaCO_3$. The results are collated in the table below:

| Parameters | Inlet concentration | Outlet concentration |
| --- | --- | --- |
| $[Ca^{2+}]$ (g/L) | 1.35 | 0.682 |
| $[Ca^{2+}]$ (mol/L) | 0.034 | 0.0171 |
| $[HCO_3^-]$ (g/L) | 0.949 | 0.077 |
| $[HCO_3^-]$ (mol/L) | 0.0156 | 0.0013 |
| Precipitated $CaCO_3$ | — | 1.7 |
| $[CaCO_3]_{soluble}$ (mol/L) | 0.023 | 0.0047 |

In the presence of precipitation-inhibiting product, the spontaneous precipitation of the calcium carbonate is maintained. Between 90% and 100% of the precipitation-inhibiting products are trapped in the reactor.

During the test, the SS fluctuate between 2 g/l and 35 g/l in the reactor. Slight scaling is observed in the sludge extraction pipework and also wall clogging which reduces the concentration of suspended solids in the reactor. Although the concentration of SS in the reactor is really high to maintain the stability, the adsorption of phosphonates remains efficient, as may be seen in FIG. 14.

As may be seen in FIG. 15, without the precipitation-inhibiting product, the mean particle sizes (D50) were close to values of between 40 μm and 160 μm.

It is observed that the D50 and the D90 increase greatly after injection of the precipitation-inhibiting product, respectively from 70 μm to 250 μm and from 400 μm to 800 μm. The D10 does not appear to be affected, and there is no further production of fine particles.

The precipitation-inhibiting product has an effect on the particle sizes and appears to greatly improve the agglomeration of the particles (as illustrated in FIG. 16).

These tests at continuous flow rate reveal that the precipitation of calcium carbonate is capable of removing 90% of the phosphonates at a pH regulated between 8.4 and 8.5, allowing desupersaturation of the $CaCO_3$. The precipitated calcium carbonate tends to reach the reaction equilibrium between the $CaCO_3$ seeds required for the adsorption of the phosphonates and the precipitation of the $CaCO_3$ particles. The $CaCO_3$ particles created with the phosphonates are agglomerated.

Example 6

Thereafter, tests were conducted in the presence of carbonates and sulfate (operating conditions similar to those described previously in Example 5):

Operating conditions:
flow rate: 10 l/h
reaction time: 30 min
seeding: gypsum (6 g/l) and $CaCO_3$ (100 g/l)
SS target in the reactor: >100 g/L
stirring speed: 950 rpm
test time: several days
Compositions (may vary slightly depending on the test):
[Total alkalinity]$_{reactor}$=1 594 mg/L eq $CaCO_3$
[$SO_4^{2-}$]$_{reactor}$=6 g/L
[$Ca^{2+}$]$_{reactor}$=1 g/L
Precipitation-inhibiting product (antiscaling agent): phosphonate (ATMP and HDTMPA at 1.8 mg/L eq $PO_4^{3-}$ of phosphonates).

In the same manner as during the preceding tests, more than 90% of the phosphonates are removed and 88% of the alkalinity is removed, this being achieved after more than 10 days of functioning. The table below collates a few results.

| Parameters | Inlet concentration | Outlet concentration |
|---|---|---|
| [$Ca^{2+}$] (g/L) | 1.082 | 0.636 |
| [$Ca^{2+}$] (mol/L) | 0.027 | 0.016 |
| [$HCO_3^-$] (g/L) | 2.115 | 0.217 |
| [$HCO_3^-$] (mol/L) | 0.034 | 0.0035 |
| [$SO_4^{2-}$] (g/L) | 6.420 | 5.718 |
| [$SO_4^{2-}$] (mol/L) | 0.067 | 0.0595 |
| $CaCO_3$ (g/L) precipitate | — | 0.35 |
| Gypsum (g/L) precipitate | — | 1.29 |
| [$CaCO_3$]$_{soluble}$ (mol/L) | 0.030 | 0.007 |
| [$CaSO_4, 2H_2O$]$_{soluble}$ (mol/L) | 0.043 | 0.031 |

The very satisfactory performance in terms of removal of phosphonates throughout the tests confirms that the amount of $CaCO_3$ produced by the reaction makes it possible to provide a sufficient amount of seeds to maintain the removal of the precipitation-inhibiting products.

Figure 17B:
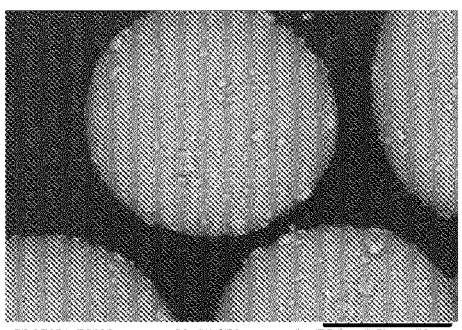

The SEM analyses represented in FIGS. 17A and 17B show that the morphology of the precipitated particles is in the form of spherical particles. Moreover, an FX analysis makes it possible to demonstrate the lime $CaCO_3$. A more detailed SEM analysis suggests that aragonite is indeed present. Specifically, a magnification on the surface of the formed particles (FIG. 18) reveals that they are composed of agglomerates of needles that are characteristic of the aragonite form.

Example 7: Continuous Pilot Tests of Lines with a High Conversion Rate

Tests were conducted so as to validate in continuous pilot functioning the line with a high conversion rate on the basis of the following modeling:

The scheme of the line tested is represented in FIG. 19.

Prior to the tests, a digital simulation was performed using calculation models, the scheme of which is presented in FIG. 20. The modeling of the line on the basis of a real effluent (a mine drainage water) gives the results that are collated in the following table:

| Parameter | | Feed water of the approach | Inlet reverse osmosis | Inlet desupersaturation reactor | Inlet MF/UF | Treated water (RO permeate) |
|---|---|---|---|---|---|---|
| Flow rate | m3/h | 446.85 | 564.62 | 141.15 | 138.55 | 423.46 |
| Average temperature | C. | 13.00 | 13.00 | 13.00 | 13.00 | 13.00 |
| Pressure | bar | 3.50 | 0.00 | 28.60 | 0.00 | 1.00 |
| SC | mg/L | 3374.43 | 13181.60 | 52580.71 | 50447.02 | 67.08 |
| COT | mg/L | 0.00 | 0.00 | 0.00 | 0.00 | 0.00 |
| SSM | mg/L | 2.00 | 3.67 | 14.67 | 10.00 | 0.00 |
| pH | — | 7.35 | 6.80 | 8.03 | 8.45 | 5.22 |
| Conductivity | uS/cm | 2949.11 | 8844.18 | 27924.26 | 27398.48 | 112.88 |
| CO2 | mg/L | 38.20 | 82.30 | 18.68 | 0.16 | 48.06 |
| Silica | mg/L | 12.90 | 60.67 | 241.89 | 241.89 | 0.26 |
| Boron | mg/L | 0.00 | 0.00 | 0.00 | 0.00 | 0.00 |
| Dissolved O2 | mg/L | 10.29 | 9.76 | 9.76 | 7.73 | 9.76 |
| Calcium | mg/L | 340.00 | 309.51 | 1234.92 | 193.81 | 1.04 |
| Magnesium | mg/L | 230.00 | 1084.89 | 4328.32 | 4328.32 | 3.75 |
| Sodium | mg/L | 301.00 | 2127.15 | 8490.37 | 9054.82 | 13.73 |
| Potassium | mg/L | 7.30 | 33.23 | 131.58 | 131.58 | 0.45 |
| NH4(+) | mg/L | 0.14 | 0.31 | 0.92 | 0.90 | 0.10 |
| NH3 | mg/L | 0.00 | 0.00 | 0.01 | 0.03 | 0.00 |
| Bicarbonates | mg/L | 547.22 | 368.34 | 1469.93 | 31.97 | 4.25 |
| Carbonates | mg/L | 0.87 | 0.24 | 24.24 | 1.36 | 0.00 |
| Chlorides | mg/L | 26.58 | 122.74 | 487.50 | 487.50 | 1.15 |
| Sulfates | mg/L | 1900.00 | 9064.66 | 36133.26 | 35959.55 | 41.80 |
| Nitrates | mg/L | 1.00 | 2.80 | 9.63 | 9.63 | 0.53 |
| Total sulfites | mg/L | 0.00 | 0.00 | 0.00 | 0.00 | 0.00 |
| Fluoride | mg/L | 0.50 | 0.77 | 3.07 | 1.82 | 0.01 |
| PO4(---) | mg/L | 0.00 | 0.00 | 0.00 | 0.00 | 0.00 |
| HPO4(--) | mg/L | 0.07 | 0.04 | 0.31 | 0.00 | 0.00 |
| H2PO4(-) | mg/L | 0.03 | 0.04 | 0.01 | 0.00 | 0.00 |
| Total sulfides | mg/L | 0.00 | 0.00 | 0.00 | 0.00 | 0.00 |
| Barium | mg/L | 0.02 | 0.02 | 0.07 | 0.00 | 0.00 |
| Strontium | mg/L | 6.60 | 5.24 | 20.92 | 0.09 | 0.02 |
| Dissolved Fe | mg/L | 0.10 | 0.47 | 1.88 | 1.88 | 0.00 |
| Total Fe | mg/L | 0.66 | 0.92 | 3.66 | 1.88 | 0.00 |
| Dissolved Mn | mg/L | 0.05 | 0.24 | 0.94 | 0.94 | 0.00 |
| Total Mn | mg/L | 0.21 | 0.36 | 1.45 | 0.94 | 0.00 |

The results obtained in these continuous tests over several days are collated in the table below:

|  |  | Reverse osmosis | | | Desupersaturation unit | |
|---|---|---|---|---|---|---|
| Parameter |  | RO feed | RO concentrate | Treated water (RO permeate) | Reactor feed | MF/UF feed |
| SC | mg/L | 14472.00 | 42860.00 | 173.00 | | |
| SSM | mg/L | 0.00 | 0.00 | 0.00 | 0.00 | 300.00 |
| pH | — | 8.68 | 8.51 | 8.51 | 8.60 | 8.45 |
| Conductivity | uS/cm | 16410.00 | 48600.00 | 196.00 | 45169.00 | 44792.00 |
| Calcium | mg/L | 300.00 | 1022.00 | 3.00 | 1140.00 | 750.00 |
| Bicarbonates | mg/L | 400.00 | 1470.00 | 16.50 | 1160.00 | 630.00 |
| Sulfates | mg/L | 8840.00 | 31900.00 | <40 | 30000.00 | 28700.00 |
| P—PO4 (HEDP and DTPMPA) | mg/L | 1.37 | 5.60 | 0.05 | 5.53 | 0.38 |
| P—PO4 (ATMP and HDTMPA) | mg/L | | | | 6.82 | 0.80 |

A good quality of permeate is thus obtained and, during the desupersaturation step, the removal of the precipitation-inhibiting products (antiscaling agents) is obtained, demonstrated by the reduction in P-PO$_4$. Moreover, some of the carbonates, calcium and sulfates precipitate in the reactor.

In the supernatant, these dissolved salts thus stem from the desupersaturation at a content not leading to precipitation. This is confirmed by the behavior of the ceramic membrane which shows no clogging.

The behavior of an HEDP and DTPMPA mixture was followed over the entire line. That of the ATMP and HDTMPA mixture alone during the desupersaturation step since it was confirmed that when the latter is effective, the rest of the line is validated.

Each of the steps of the method was specifically monitored.

1. Description of the reverse osmosis membrane unit:

The membrane used for these tests is a reverse osmosis membrane, of BW30-400 type (DOW®). A simulation and then monitoring of the experimental tests with a focus on a possible clogging potential of the polymerization layer was performed.

Results obtained on the reverse osmosis membrane unit:
the dosing of precipitation-inhibiting products was effective for all the test products (HEDP+DTPMPA and ATMP+HDTMPA): no clogging observed at these dosages on the polymerization layer of the membrane with recycling of the desupersaturated effluent.
the quality of the permeate obtained experimentally is in accordance with the modeling
the operating conditions were validated (the rejection rate, feed pressure, streams of permeate; etc.).

2 Description of the concentrate desupersaturation unit (SAPHIRA reactor)

The operating conditions are as follows:
seeding of the reactor with a mixture of CaCO$_3$ in the form of the aragonite polymorph+CaSO$_4$.2H$_2$O (150 g/L)
residence time=30 min (10-11 l/h)
regulation of the pH with sodium hydroxide to between 8.5 and 9.0
composition of the concentrate: Ca$^{2+}$: 1.2 g/L; total alkalinity (TAC): 1 g/L eq CaCO$_3$; SO$_4^{2-}$: 30 g/L-35 g/l.
Solid content in the reactor: maintained between 100 and 250 g/L
Experimental line:
2 precipitation-inhibiting products tested/concentrations:
a mixture of ATMP and HDTMPA with an equivalent content of P-PO$_4$ of 7.4 mg/l
a mixture of HEDP and DTPMPA tested at equivalent contents of P-PO$_4$ of 4.6 and then 5.7 ppm The results obtained in terms of decrease of the precipitation-inhibiting products are collated in FIG. 21 for the mixture of ATMP and HDTMPA.

It is observed that continuously about 90% of the precipitation-inhibiting products are removed. Moreover, the precipitation rate of the lime is about 50%: 90% of the precipitation-inhibiting products removed with CaCO$_3$ at a pH of between 8.4 and 9.

The trapping rate of the precipitation-inhibiting products depends on the type of polymorphism of the CaCO$_3$ (the aragonite particles have a better adsorption rate). Specifically, the reduction rate is no longer as stable when calcite is present. The mean reductions obtained during the tests are collated in the table below:

|  |  | Desupersaturation unit | |
|---|---|---|---|
| Parameter |  | Reactor feed | MF/UF feed |
| SC | mg/L | | |
| ss | mg/L | 0.00 | 300.00 |
| pH | — | 8.60 | 8.45 |
| Conductivity | uS/cm | 45169.00 | 44792.00 |
| Calcium | mg/L | 1140.00 | 750.00 |
| Bicarbonates | mg/L | 1160.00 | 630.00 |
| Sulfates | mg/L | 30000.00 | 28700.00 |
| Phase 1: P—PO$_4$ (HEDP and DTPMPA) | mg/L | 5.53 | 0.38 |
| Phase 2: P—PO$_4$ (ATMP and HDTMPA) | mg/L | 6.82 | 0.80 |

3. Description of the microfiltration/ultrafiltration (UF) membrane unit:
Characteristics of the UF modules tested:
material: ceramic membrane
The operating conditions and experimental lines:
feed: overflow of the SAPHIRA reactor (target on the suspended solids (SS)~50 mg/l)
concentration factor=20
Results obtained on the microfiltration/ultrafiltration (UF) membrane unit:
the hydraulic performance qualities are satisfactory
the quality of the permeate is in accordance with the simulation (no suspended solids after filtration)
These tests thus allowed us to validate functioning of this line with a conversion rate of 95%.

The invention claimed is:

1. A method of removing contaminant compounds from a feedwater in a membrane separation system while increasing water recovery rate, the method comprising:

injecting a precipitation inhibitor reagent into the feedwater;

directing the feedwater containing the contaminant compounds and the precipitation inhibitor reagent to a membrane separation unit and producing a permeate and a first concentrate supersaturated with the contaminant compounds and containing the precipitation inhibitor reagent;

directing the first concentrate supersaturated with the contaminant compounds and containing the precipitation inhibitor reagent to a reactor containing suspended solids and having an integrated first solids-liquid separator, a mixing zone in the lower portion of the reactor, and a tranquilization structure in an upper portion of the reactor;

maintaining a heavy suspended solids concentration of 20-800 g/L in the reactor for the purpose of facilitating the de-supersaturation of the contaminant compounds in the reactor;

mixing the supersaturated contaminant compounds, the precipitation inhibitor reagent, and the suspended solids in the mixing zone of the reactor;

wherein mixing the supersaturated contaminant compounds with the heavy concentration of suspended solids in the reactor gives rise to de-supersaturating the supersaturated contaminant compounds in the reactor by continuously precipitating in situ the supersaturated contaminant compounds;

removing sludge from the reactor wherein the sludge comprises the precipitated contaminant compounds, precipitation inhibitor reagent, and some of the suspended solids;

recovering from the reactor a treated supernatant substantially free of suspended solids; and enhancing the water recovery rate of the membrane system by continuously recycling the supernatant to the membrane separation unit, or continuously directing the treated supernatant to a second solids-liquid separator and producing a first filtrate substantially free of suspended solids and a second concentrate and recycling the first filtrate to the membrane separation unit.

2. The method of claim 1 wherein the contaminant compounds include calcium sulfate and wherein the first concentrate is supersaturated with calcium sulfate; and mixing the supersaturated calcium sulfate with the heavy concentration of suspended solids in the reactor causes the supersaturated calcium sulfate to precipitate and crystallize onto the surfaces of the suspended solids.

3. The method of claim 1 including lowering the pH of the feedwater prior to reaching the membrane separation unit and raising the pH of the first concentrate at a point between the membrane separation unit and the reactor.

4. The method of claim 1 wherein the feedwater directed to the membrane separation unit includes contaminant compounds chosen from the group consisting of chloride, boron, magnesium, sulfate, barium, silica, fluoride, strontium, cesium, phosphate ions, metals, and a mixture thereof.

5. The method of claim 1 further including maintaining the concentration of the suspended solids in the reactor between 25 and 200 g/L.

6. The method of claim 1 including maintaining a hydraulic residence time in the reactor at between three minutes and two hours.

7. The method of claim 1 further including maintaining a water recovery rate of at least 95% by continuously recycling the treated supernatant or the first filtrate to the membrane separation unit.

8. The method of claim 1 wherein reactions taking place in the reactor occur in the absence of a coagulating agent or a flocculating agent.

9. The method of claim 1 wherein the method is carried out in the absence of a precipitation reagent.

10. The method of claim 1 including:

continuously directing the treated supernatant to the second solids-liquid separator and producing the first filtrate substantially free of suspended solids and the second concentrate and recycling the first filtrate to the membrane separation unit;

directing the sludge to a dewatering device and producing a second filtrate and a solids residue; and further enhancing the water recovery rate by continuously directing the second filtrate back to the membrane separation unit.

11. The method of claim 10 including recycling the second concentrate back to the reactor and mixing the second concentrate with the supersaturated contaminant compounds and the suspended solids in the mixing zone of the reactor.

12. A method of removing contaminant compounds from a feedwater in a membrane separation system while increasing water recovery rate, the method comprising:

directing the feedwater containing the contaminant compounds to a membrane separation unit and producing a permeate and a first concentrate supersaturated with the contaminant compounds;

directing the first concentrate supersaturated with contaminant compounds to a reactor containing suspended solids and having an integrated first solids-liquid separator, a mixing zone in a lower portion of the reactor, and a tranquilization structure in an upper portion of the reactor;

maintaining a heavy suspended solids concentration of 20-800 g/L in the reactor for the purpose of facilitating the de-supersaturation of the contaminant compounds in the reactor;

mixing the supersaturated contaminant compounds and the suspended solids in the mixing zone of the reactor;

wherein mixing the supersaturated contaminant compounds with the heavy concentration of suspended solids in the reactor gives rise to de-supersaturating the supersaturated contaminant compounds in the reactor by continuously precipitating in situ the supersaturated contaminant compounds;

recovering from the reactor a treated supernatant substantially free of suspended solids;

enhancing the water recovery rate of the membrane system by continuously directing the treated supernatant to a second solids-liquid separator and producing a first filtrate substantially free of suspended solids and a second concentrate and recycling the first filtrate to the membrane separation unit;

directing sludge from the reactor to a dewatering device, the sludge comprising the precipitated contaminant compounds and at least some of the suspended solids;

wherein the dewatering device produces a second filtrate substantially free of suspended solids and a solids residue; and further enhancing the water recovery rate of the membrane system by continuously recycling the second filtrate from the dewatering device to the membrane separation unit.

13. The method of claim 10 including controlling the water recovery rate by purging a portion of the first filtrate or a portion of the second filtrate.

14. The method of claim 12 including controlling the water recovery rate by purging a portion of the first filtrate or a portion of the second filtrate.

* * * * *